(12) United States Patent
Nakagome et al.

(10) Patent No.: US 7,032,563 B2
(45) Date of Patent: Apr. 25, 2006

(54) INTAKE APPARATUS FOR ENGINE

(75) Inventors: Hiroshi Nakagome, Wako (JP); Toshihisa Nagashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 10/802,324

(22) Filed: Mar. 16, 2004

(65) Prior Publication Data
US 2005/0150703 A1    Jul. 14, 2005

(30) Foreign Application Priority Data

Mar. 31, 2003 (JP) .............................. 2003-095107
Sep. 9, 2003 (JP) .............................. 2003-317592

(51) Int. Cl.
*F02B 77/00* (2006.01)
(52) U.S. Cl. ................... 123/198 E; 55/385.3
(58) Field of Classification Search ............ 123/198 E; 55/385.3, 419
See application file for complete search history.

(56) References Cited

FOREIGN PATENT DOCUMENTS

JP          02123273 A    *    5/1990

* cited by examiner

*Primary Examiner*—Noah P. Kamen
(74) *Attorney, Agent, or Firm*—Hamre, Schumann, Mueller & Larson, P.C.

(57) ABSTRACT

In an intake duct, a first intake passage arranged in a width direction of the front wheel and a second intake passage arranged on a side of the first intake passage are formed such that a flow area of the first intake passage is set larger than a flow area of the second intake passage. An intake control valve closes the first intake passage when the engine rotates at low speed and opens the first intake passage when the engine rotates at high speed.

18 Claims, 22 Drawing Sheets

INTAKE APPARATUS FOR ENGINE

BACKGROUND OF THE INVENTION

1. Field of the Invention

The present invention relates to an intake apparatus for an engine for a vehicle. The present invention is particularly suitable for use in a vehicle such as a motorcycle.

2. Description of the Related Art

Various intake apparatuses have been used with vehicles. For example, Japanese Patent Laid-Open No. 2001-73810 describes a conventional air cleaner that is arranged behind a head pipe provided in a front end of a motorcycle frame. An intake duct that extends forward from the air cleaner is arranged below the head pipe. However, conventional intake apparatuses have several disadvantages. It is desirable to shorten an intake duct in order to effectively introduce moving air into an air cleaner. At the same time, it is desirable to increase the opening area of the intake duct in order to increase the available power of the engine. However, water splashed by a front wheel or other foreign objects can enter the air cleaner and cause various problems. Accordingly, it is desirable to provide an intake apparatus that solves these problems.

SUMMARY OF THE INVENTION

In one aspect of the invention, an intake apparatus of an engine for a vehicle is provided. The intake apparatus is capable of taking in a larger amount of intake air when the engine rotates at a high speed as compared with when the engine rotates at a low speed, while being configured to minimize the entry of water splashed by a front wheel and or other foreign objects, such as small rocks or other road debris, into the air cleaner.

In one aspect of the invention, when the engine E operates at low speed, that is, when running the small vehicle at low speed because of a roadway where water is prone to be splashed and a foreign object is prone to be ricocheted, the first intake passage arranged on the centerline in the width direction of the front wheel is closed. Accordingly, the water and the foreign objects can be largely prevented from entering the air cleaner. Moreover, when the engine rotates at high speed, it is difficult for the water to be splashed upward and for the foreign objects to be ricocheted upward due to a moving air from the front of the vehicle, and accordingly, the water and the foreign objects can be prevented from entering the air cleaner as much as possible. Furthermore, the first intake passage of which flow area is large opens to introduce air of a relatively large volume into the air cleaner, thus making it possible to contribute to an increase in engine power.

In another embodiment of the present invention, an intake amount is restricted to be small when the engine operates at low speed, and thus it is possible to obtain good acceleration performance by supplying appropriately rich mixture to the engine while restricting the mixture from leaning also at the time of an acceleration operation. Moreover, volume efficiency of the engine is enhanced by reducing intake resistance when the engine operates at high speed, thus making it possible to contribute to enhancement of engine performance. In addition, the first intake control valve and the second intake control valve can be driven to open and close by rotationally driving the one valve shaft, and accordingly, the structure is made simple.

In another embodiment of the invention, an arrangement is provided so that when external air is introduced from the second intake passage into the air cleaner, the water and the foreign objects can be prevented from entering the second intake passage as much as possible due to a labyrinth structure of a baffle board.

In yet another embodiment of the invention, an arrangement is provided so that when the engine rotates at high speed, moving air is introduced into the first intake passage efficiently, and thus intake efficiency can be enhanced. Moreover, it is made possible to make it difficult for the foreign object and the water to enter the second intake passage introducing the air therethrough when the engine rotates at low speed.

In another embodiment of the invention, an arrangement is provided so that in a space between the radiator and the continuous portion of the head pipe and both main frames, the intake duct can be effectively arranged while enlarging an opening portion of the front end portion thereof. Furthermore, an actuator mounted on the small vehicle in order to drive an operating member controlled in response to the number of revolutions of the engine is connected to the intake control valve in order to drive the intake control valve to open and close. With such a constitution, the intake control valve can be driven while avoiding an increase of the number of parts and achieving a downsizing and weight reduction of the intake apparatus.

In another embodiment of the invention, an arrangement is provided so that a first intake control valve is fixed to a valve shaft having an axis orthogonal to a flowing direction of air flowing through the first intake passage and rotatably supported in the intake duct in a manner of having a posture tilted rearward and upward in a state of closing the first intake passage. With such a constitution, though the water splashed by the front wheel and the foreign objects ricocheted thereby are prone to enter an upper portion in the front end opening portion of the first intake passage. When the intake control valve starts to operate from a valve closing state thereof to a valve opening side, it is facilitated for the splashed water and the ricocheted foreign objects to collide with the intake control valve even if the splashed water and the bounded foreign object enter the front end opening end of the first intake passage. Thus, an advantage is brought in terms of preventing the entry of the water and foreign object to the air cleaner side. Moreover, a first intake control valve can be formed such that, in a valve closing state thereof, an area of a portion above the valve shaft is set larger than an area of a portion below the valve shaft. With such a constitution, a greater advantage is provided in terms of preventing the entry of the foreign objects to the first intake passage.

In another embodiment of the invention, an arrangement is provided in which an air intake passage of an air cleaner (for example, an air cleaner 87 in an embodiment) interposed in an intake system of the engine (for example, an engine E in the embodiment) is made to face forward in a vehicle, characterized in that at least two of the air intake passages, one large and one small, are provided. The large air intake passage (for example, a first intake passage 119 in the embodiment) opens when the engine rotates at high speed, the other air intake passage (for example, second intake passages 120 in the embodiment) is always closed, and in the other rotation range, an opening and closing order is reversed.

By such arrangement, when the large air intake passage opens with the engine rotating at the high speed, the ram pressure can be effectively utilized. At that time, the other air intake passage is closed, thus making it possible to prevent entry of the water and foreign objects from the other air intake passage.

In another embodiment of the invention, an arrangement is provided so that the two large and small air intake passages are arranged in line in a width direction of the vehicle. By such arrangement, it is made possible that the two air intake passages take in the air without being mutually adversely affected.

In another embodiment of the invention, an arrangement is provided so that an air intake passage of an air cleaner interposed in an intake system of the engine is made to face forward of a vehicle, with at least three of the air intake passages arranged in line in a width direction of the vehicle. By this arrangement, it is made possible to arrange the air intake passage on the center and at least two of the air intake passages in a manner of being distributed on the both sides thereof.

In another embodiment of the invention, an arrangement is provided so that an air intake passage of an air cleaner, interposed in an intake system of the engine, is made to face forward of a vehicle. A plurality of the air intake passages are provided, and a member opening and closing the air intake passages is made as a single structure. By such an arrangement, it is possible to reduce the number of parts of the member (for example, a valve unit VU in the embodiment) opening and closing the air intake passages, and of a member (for example, an actuator 141 in the embodiment) operating this member.

In another embodiment of the invention, an arrangement is provided so that control valves (for example, a first intake control valve 126 and second intake control valves 127 in the embodiment) controlling the opening and closing of the air intake passages are provided in the respective passages, and the respective control valves are controlled to open and close in a manner of being mutually interlocked. By such an arrangement, it is possible to securely interlock the opening and closing of the respective passages.

In another embodiment of the invention, an arrangement is provided so that air intake passages open in the vicinity of a bottom bridge (for example, a bottom bridge 36 in the embodiment) supporting a front fork (for example, a front fork 21 in the embodiment), and tip ends of the air intake passages are fixed to an upper portion of a radiator (for example, a radiator 89 in the embodiment). By such an arrangement, the air can be introduced from a region in the vicinity of the bottom bridge, where the ram pressure can be obtained effectively, and it is made possible to introduce the air without being adversely affected mutually with airflow to the radiator.

In yet another embodiment of the invention, an arrangement is provided so that three air intake passages are provided. The air intake passage on a center is formed larger than the two on the sides thereof, and the two on the sides are controlled to close in a case where the air intake passage on the center opens when the engine rotates at the high speed, and controlled in a reverse order when the engine rotates at low and middle speeds. By such an arrangement, the air can be introduced from the large air intake passage on the center when the engine rotates at the high speed by effectively utilizing the ram pressure.

In another embodiment of the invention, an arrangement is provided so that the air intake passage on the center is formed into an approximately triangular shape having an upward convex, and is formed to go along a lower end edge of a front cowl (for example, a front cowl 181 in the embodiment) when viewed from front. By this arrangement, the air intake passage on the center is formed into the approximately triangular shape having a larger opening area as going to the center. Thus, it is made possible to enhance an air intake effect on the center, which is advantageous in terms of effectively obtaining the ram pressure. In this case, the air intake passage on the center goes along the front cowl, and it is made possible to effectively take in the air from the lower edge thereof.

In yet another embodiment of the invention, an arrangement is provided so that an air intake passage on the center is approximately formed to be the width between pieces of the front fork, and each of the two air intake passages on the sides thereof is approximately formed to a width of each piece of the front fork. By this arrangement, in addition to the airflow going straight toward the first intake passage, a part of the airflow flowing toward the front fork is added and introduced into the intake passage on the center, and the ram pressure can be exerted more effectively. In this case, the water and foreign objects are inhibited from entering the intake passages arranged at such positions as shading the front fork also by the front fork.

DETAILED DESCRIPTION OF THE INVENTION

Figure 1:
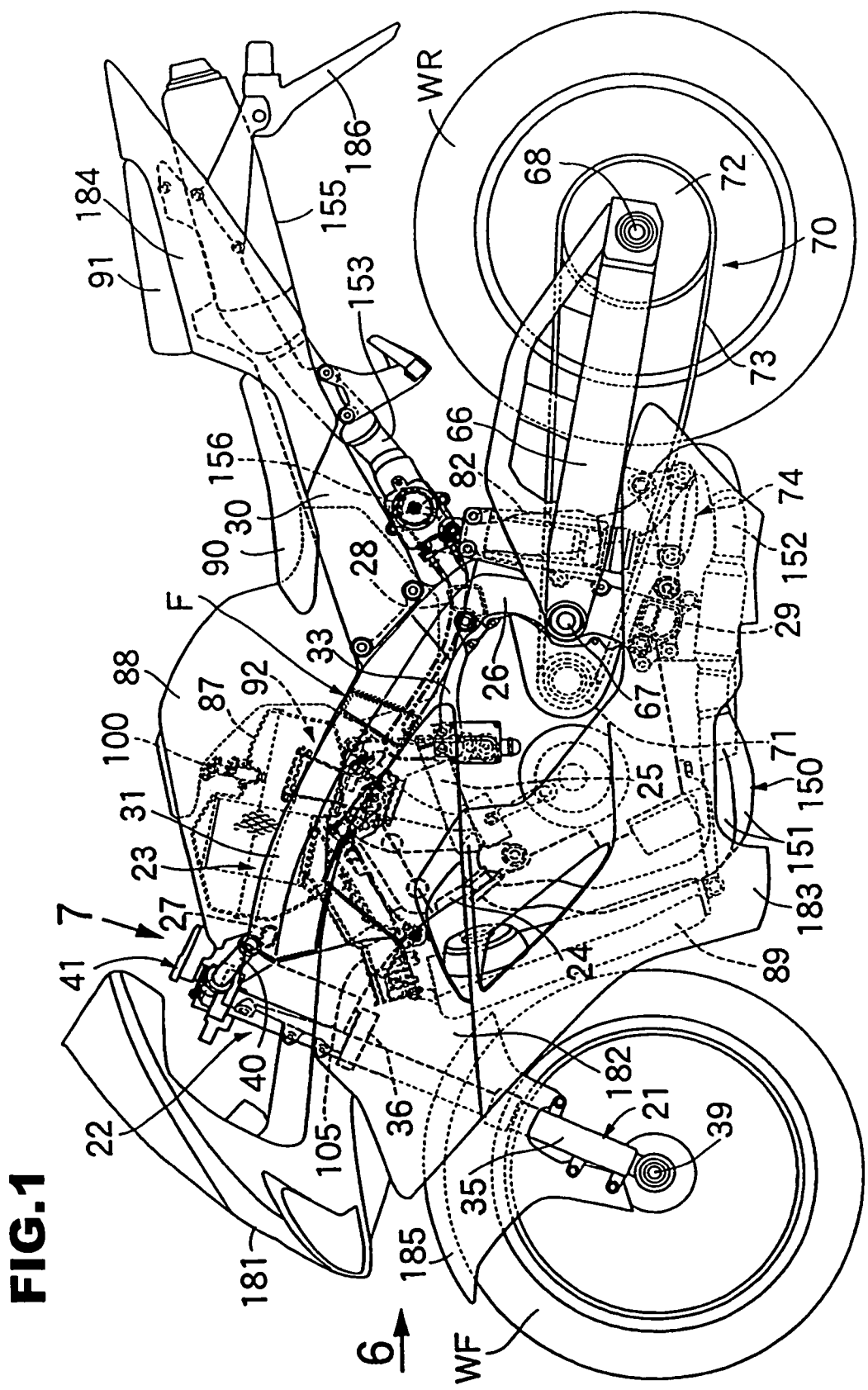
FIG. 1 is a side view of a motorcycle of the present invention.
Figure 2:
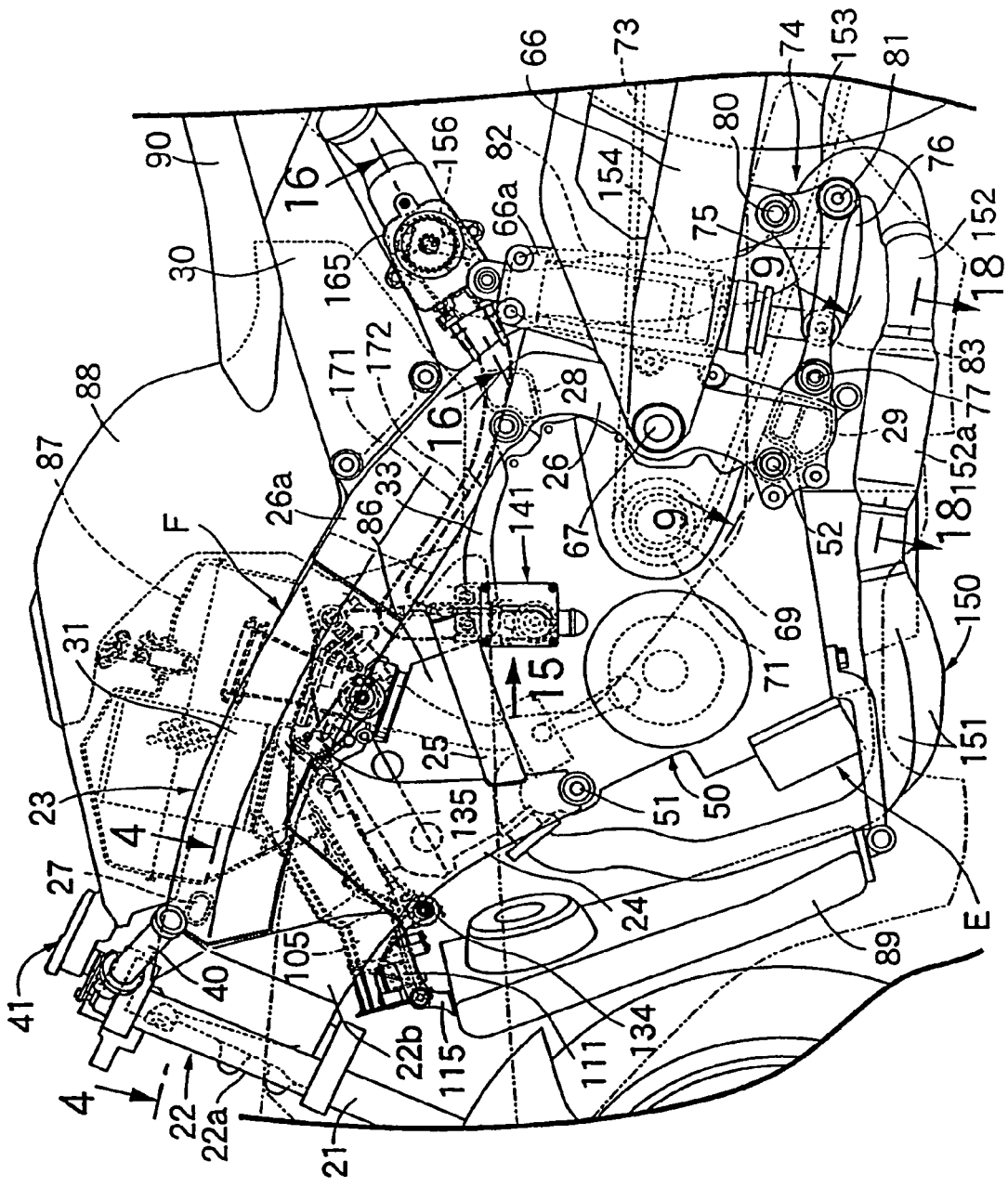
FIG. 2 is an enlarged view of a section of the motorcycle of FIG. 1.
Figure 3:
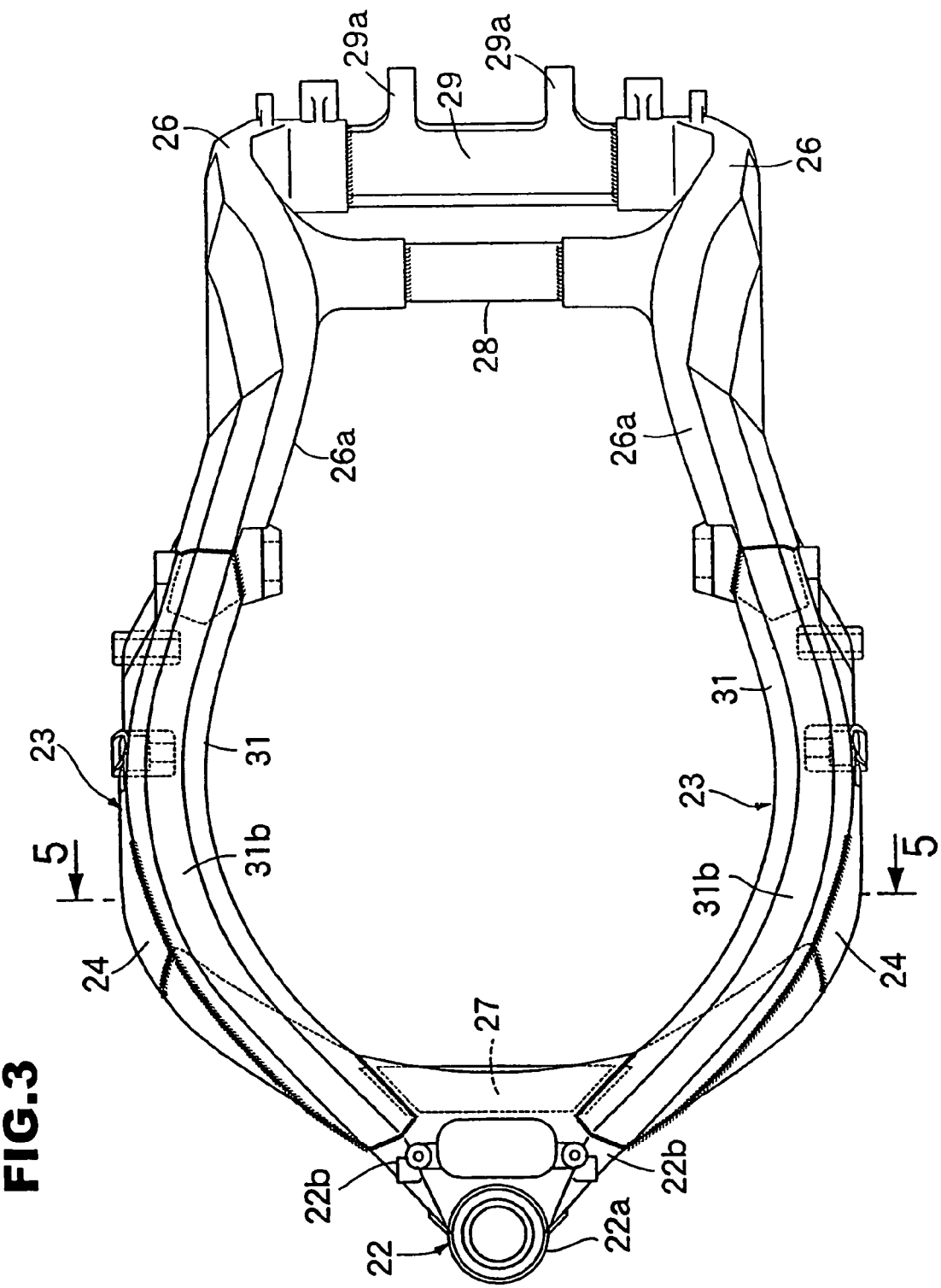
FIG. 3 is a plan view of a front portion of a body frame of the motorcycle of FIG. 1.

Referring to in FIGS. 1 to 3, a body frame F of this motorcycle includes a head pipe 22 steerably supporting a front fork 21 pivotally supporting a front wheel WF. Left-and-right pair of main frames 23 extend rearward and downward from the head pipe 22. A left-and-right pair of engine hangers 24 are welded to the head pipe 22 and front portions of the main frames 23 and extend downward from the main frames 23. Connecting pipes 25 connect lower portions of both the engine hangers 24 and support plate portions 33 provided on rear portions of the main frames 23, respectively. Left-and-right pivot plates 26 extend downward from the rear portions of the main frames 23. A first cross pipe 27 is hung across the front portions of the above-described main frames 23, a second cross pipe 28 is hung across upper portions of the above-described both pivot plates 26, and a third cross pipe 29 is hung across lower portions of the above-described both pivot plates 26. A left-and-right pair of seat rails 30 extend rearward and upward and connect to the rear portions of the above-described main frames 23.

Figure 4:
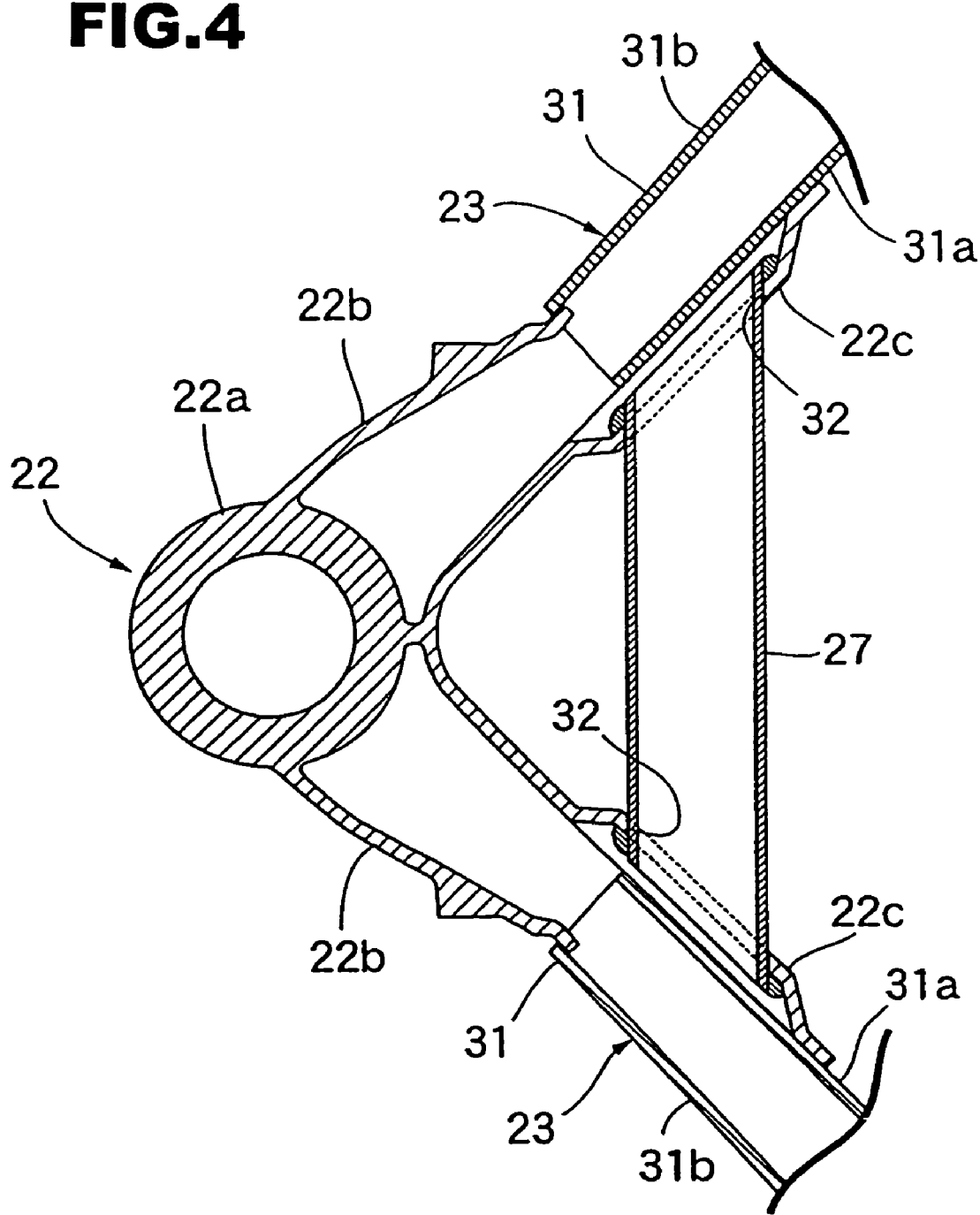
FIG. 4 is an enlarged cross-sectional view of a front portion of the body frame taken along line 4—4 of FIG. 2.

In FIG. 4, the head pipe 22 is one integrally including a cylinder portion 22a in which the front fork 21 is steerably supported. A left-and-right pair of gussets 22b and 22b extend rearward and downward from the cylinder portion 22a. The main frames 23 are formed of the gussets 22b, pipe members 31 of which front end portions are welded to the gussets 22b, and pipe portions 26a provided integrally with the above-described pivot plates 26 and welded to rear end portions of the above-described pipe members 31.

In order to hang the first cross pipe 27 across the main frames 23 and 23, attachment holes 32 are coaxially provided on inner walls of the main frames 23. Both end portions of the first cross pipe 27 are inserted into these attachment holes 32 and are welded to the inner walls of the both main frames 23.

From both gussets 22b and 22b of the head pipe 22, extended portions 22c and 22c extend rearward so as to be arranged inside of front inner walls of the pipe members 31, and are formed integrally therewith so as to constitute front inner walls of the main frames 23. The end portions of the first cross pipe 27 are inserted into the holes 32 so as to oppose the both ends to the front inner walls of the pipe members 31. The both end portions of the first cross pipe 27 are welded to outer surfaces of the above-described both extended portions 22c of the first cross pipe 27.

Figure 5:
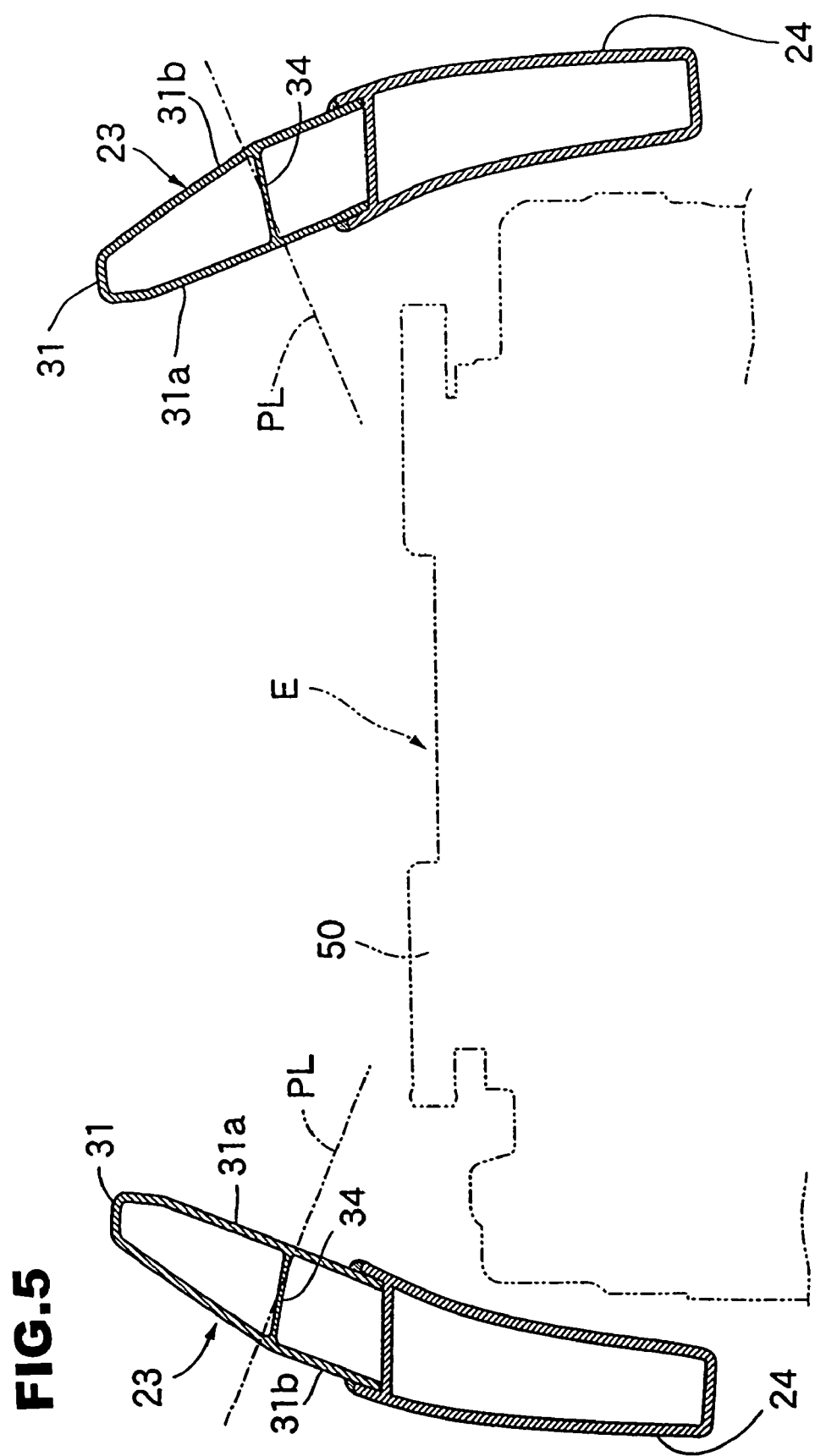
FIG. 5 is a cross-sectional view taken along line 5—5 of FIG. 2.

Referring also to FIG. 5, each of the pipe members 31 is formed so as to have an outer shape of a square cylinder, in a lateral cross section, by conventionally known extrusion or pultrusion molding for an ingot of an aluminum alloy. Between intermediate portions in a vertical direction on inner side faces of each pipe member 31, a rib 34 vertically partitioning an inside of each pipe member 31 is provided integrally therewith. Note that, in a portion to which the engine hanger 24 is welded, a lower portion of each pipe member 31 is cut downward, that is, so as to open toward the engine hanger 24 side.

Each pipe member 31 is formed into a vertically long square cylinder shape having an inner wall 31a flat across substantially the whole length in the vertical direction and an outer wall 31b substantially along the inner wall 31a. Each pipe member 31 is bent in a plane PL orthogonal to the above-described inner wall 31a such that an intermediate portion thereof in a longitudinal direction is curved to protrude out sideward. In addition, the both pipe members 31 after the bending are provided continuously with the gussets 22b of the head pipe 22 in a tilted manner to come closer to each other in an upward direction.

Figure 6:
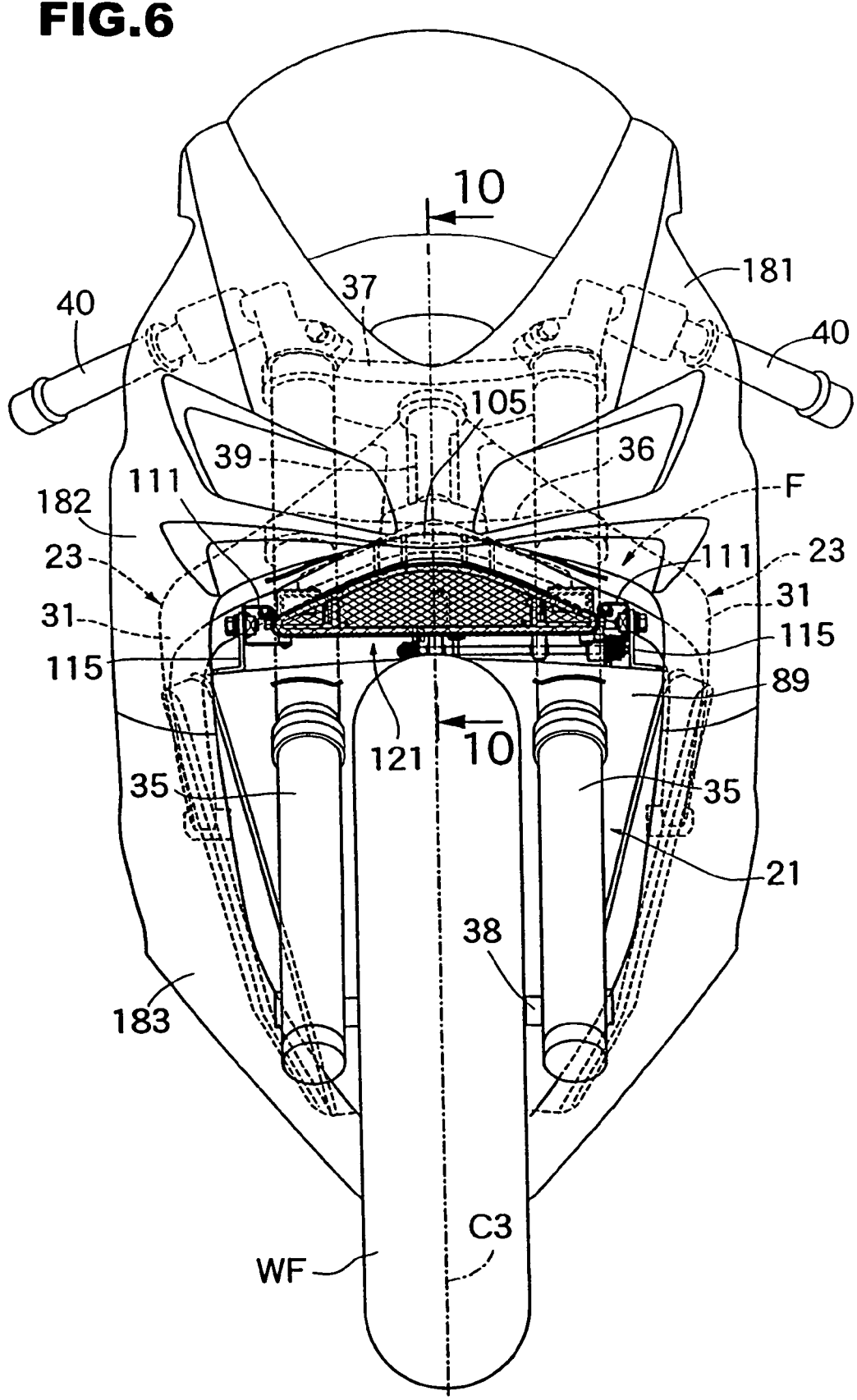
FIG. 6 is an enlarged view taken from the perspective of arrow 6 of FIG. 1.

In FIG. 6, the front fork 21 includes cushion units 35 extended vertically on both left-and-right sides of the front wheel WF. A bottom bridge 36 connects both cushion units 35 above the front wheel WF, and a top bridge 37 connect upper portions of the cushion units 35. A wheel axle 38 of the front wheel WF is pivotally supported between lower end portions of the cushion units 35.

Figure 7:
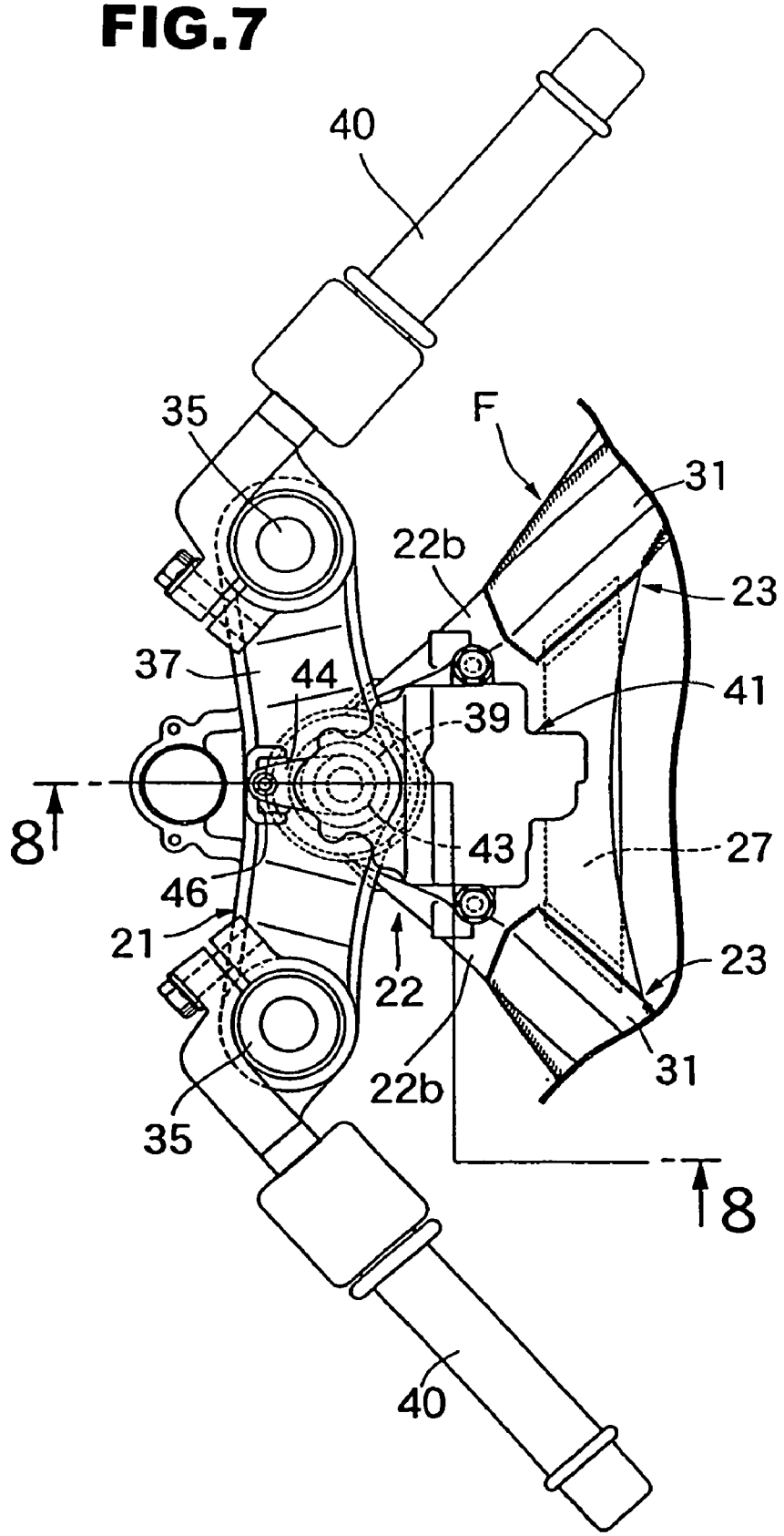
FIG. 7 is an enlarged view taken from the perspective of arrow 7 of FIG. 1.
Figure 8:
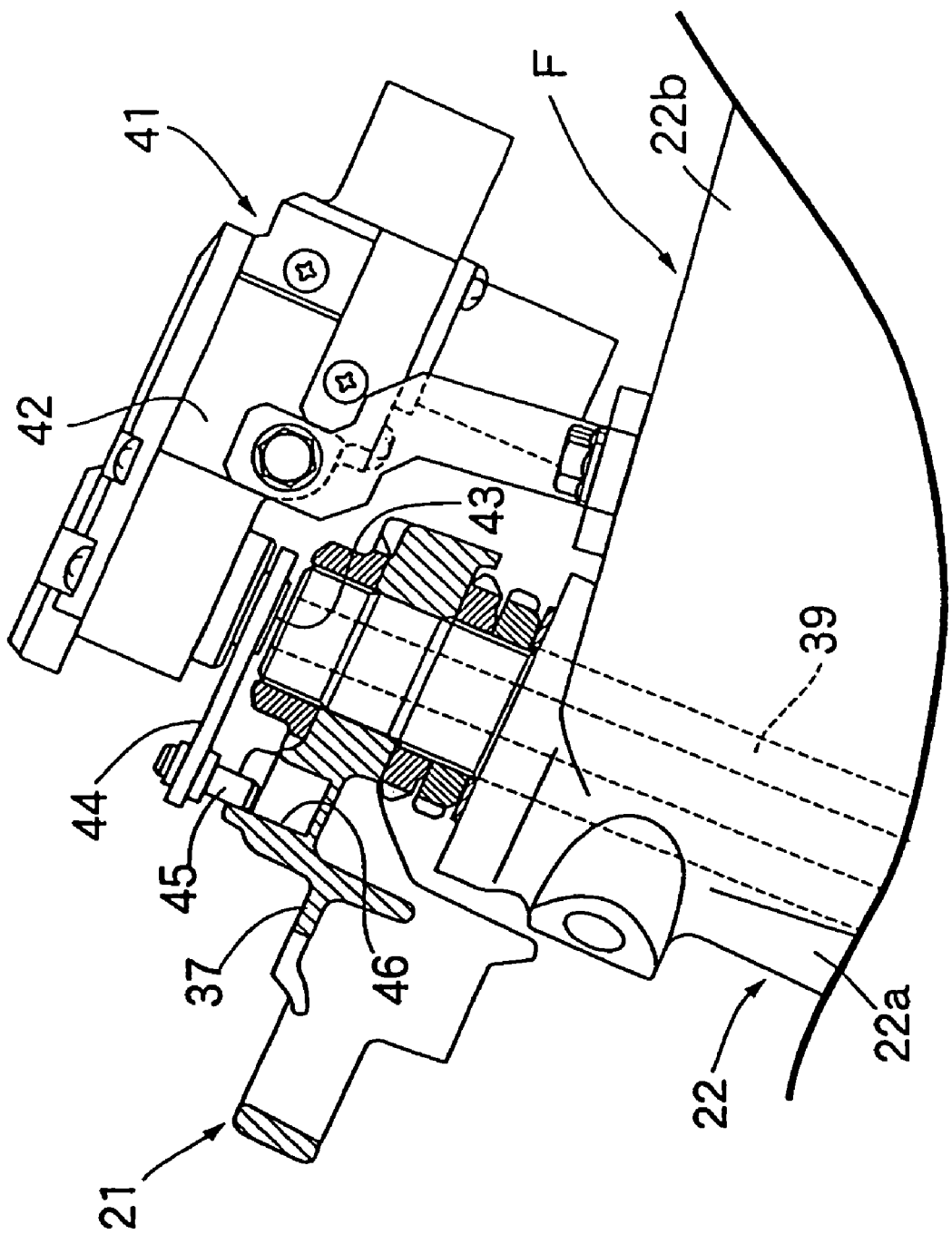
FIG. 8 is a cross-sectional view taken along line 8—8 of FIG. 7.

With reference to FIGS. 7 and 8 in addition, between the above-described bottom bridge 36 and top bridge 37 on a rear side of a center portion between the above-described cushion units 35, a steering stem 39 parallel to the cushion units 35 is provided. This steering stem 39 is rotatably supported in the cylinder portion 22a of the head pipe 22.

To upper end portions of the above-described cushion units 35 above the above-described bottom bridge 36, left-and-right separate bar-shaped steering handles 40 are connected. Moreover, between a front end portion of the body frame F, that is, the head pipe 22, and the top bridge 37 in the front fork 21, a steering damper 41 is provided.

This steering damper 41 includes a housing 42 building an unillustrated hydraulic damping mechanism therein and fixedly supported on the head pipe 22, a rotating shaft 43 arranged coaxially above the above-described steering stem 39 and rotatably supported in the above-described housing 42, an arm 44 extended forward, a base end portion of which is fixed to the rotating shaft 43, an elastic roller 45 pivotally supported on a tip end of the arm 44, and a concave portion 46 provided on an upper surface of a center portion of the above-described top bridge 37 so that the elastic roller 45 can be fitted into the same concave portion 46 in a manner that an outer circumferential surface of the elastic roller 45 is brought into frictional contact therewith.

By this arrangement, rotational vibrations around an axis of the steering stem 39, which are transmitted from the front wheel WF side to the top bridge 37, will be damped by the hydraulic damping mechanism in the housing 42 through the above-described arm 44.

Again in FIG. 2, an engine body 50 of a multi-cylinder engine E in which, for example, four cylinders are arranged parallel to a width direction of the body frame F is supported on the lower portions of above-described both the engine hangers 24 and the upper portions and lower portions of the above-described both pivot plates 26.

Then, to the lower portions of the engine hangers 24, the engine body 50 is fastened by a left-and-right pair of bolts 51.

Figure 9:
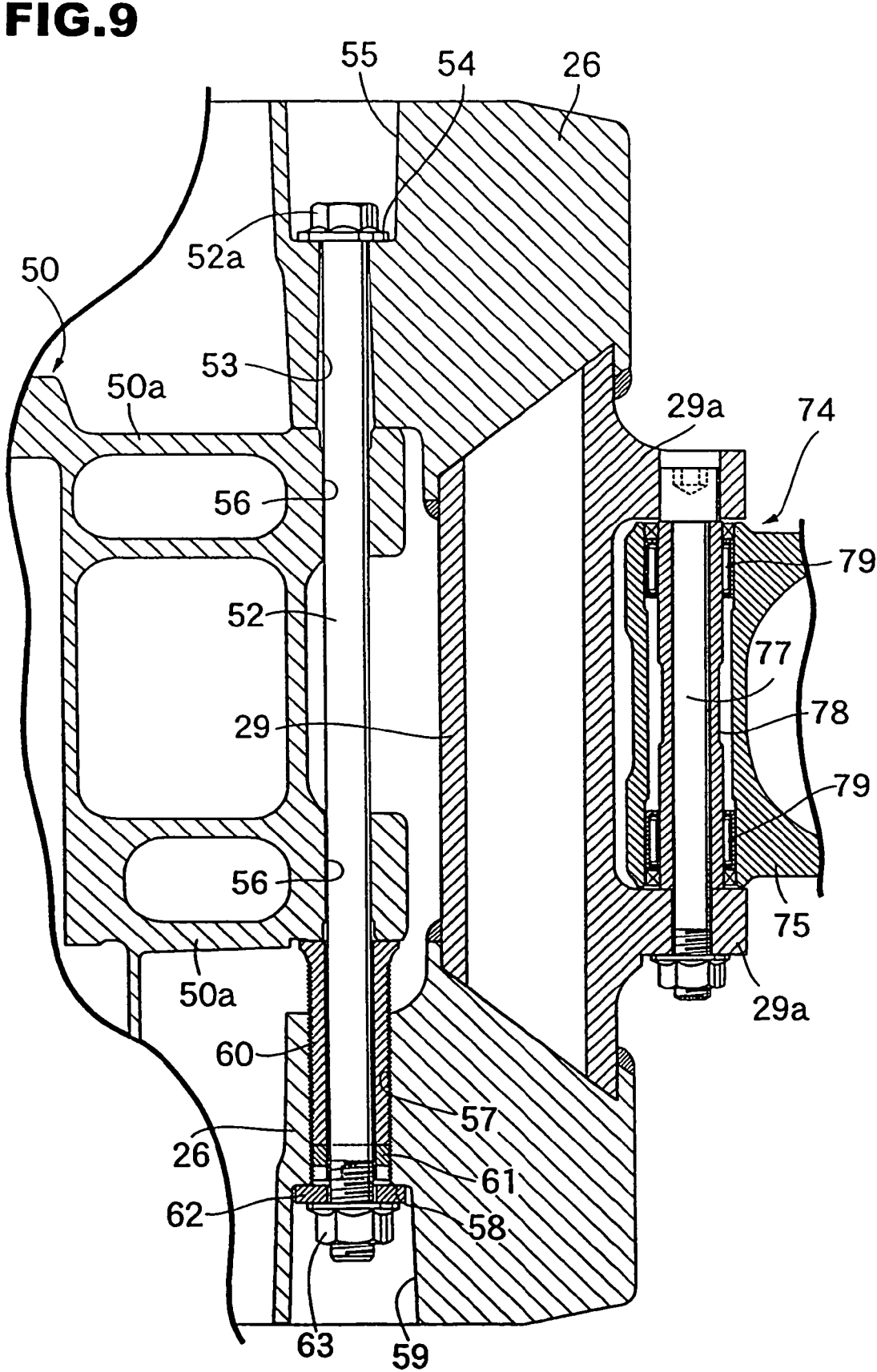
FIG. 9 is a cross-sectional view taken along line 9—9 of FIG. 2.

In FIG. 9, to support the engine body 50 on the lower portions of the pair of pivot plates 26 arranged on both sides of the engine body 50, in the lower portion of one of the both pivot plates 26 (in this embodiment, the pivot plate 26 arranged on a right side when facing forward in a traveling direction of the motorcycle), an insertion hole 53 inserting a mount bolt 52 therethrough and a first engaging portion 54 surrounding an outer end of the above-described insertion hole 53 are provided. Specifically, in the lower portion of the above-described one of pivot plates 26, the insertion hole 53 open to an inner side face of the pivot plate 26 and a first insertion hole 55 larger in diameter than the insertion hole 53 and open to an outer side face of the pivot plate 26 are provided coaxially. As a circular step portion facing the first insertion hole 55 side, the first engaging portion 54 is formed between the outer end of the insertion hole 53 and an inner end of the first insertion hole 55.

Moreover, in the engine body 50, a pair of support arm portions 50a arranged between the above-described pivot plates 26 are integrally provided at an interval in an axial direction of the above-described mount bolt 52. In these support arm portions 50a, through holes 56 inserting the mount bolt 52 therethrough are coaxially provided.

In the lower portion of the other pivot plate 26, a screw hole 57 coaxial with the above-described insertion hole 53 and a second engaging portion 58 surrounding an outer end of the screw hole 57 are provided. Specifically, in the lower portion of the other pivot plate 26, the screw hole 57 open to an inner side face of the other pivot plate 26 and a second insertion hole 59 larger in diameter than the screw hole 57 and open to an outer side face of the other pivot plate 26 are coaxially provided. As a circular step portion facing the second insertion hole 59 side, the second engaging portion 58 is formed between the outer end of the screw hole 57 and an inner end of the second insertion hole 59.

A cylindrical bolt 60 allowing one end thereof to abut on the engine body 50 is screwed into the above-described screw hole 57. Specifically, the above-described cylindrical bolt 60 is screwed to the screw hole 57 so as to allow the one end to abut on one of the support arm portions 50a in a state where the other support arm portion 50a is allowed to abut on the inner side face of one of the pivot plates 26. A cylindrical check bolt 61 abutting on the other end of the cylindrical bolt 60 is screwed to the screw hole 57 to prevent the cylindrical bolt 60 from being loosened. In addition, the cylindrical bolt 60 and the check bolt 61 are screwed to the screw hole 57 in a manner that the other end of the cylindrical bolt 60 and the check bolt 61 are located inward of the second engaging portion 58 in a state where the engine body 50 is sandwiched between the inner side face of the one of the pivot plates 26 and one end of the cylindrical bolt 60.

The above-described mount bolt 52 is one to be inserted through the insertion hole 53, the both through holes 56 of the engine body 50, the cylindrical bolt 60, the check bolt 61, and the above-described screw hole 57. A bolt head portion 52a on one end of the mount bolt 52 is engaged with either one of the above-described first and second engaging portions 54 and 58, and a nut 63 engaged with the other one of the first and second engaging portions 54 and 58 is screwed to the other end portion of the mount bolt 52. Then, in this embodiment, the other end portion of the mount bolt 52, in which the bolt head portion 52a is engaged with the first engaging portion 54, is one protruding from the above-described screw hole 57. The nut 63 screwed to the other end portion of the mount bolt 52 at the protruding portion from the screw hole 57 is engaged with the second engaging portion 58 while interposing a washer 62 therebetween.

A structure of supporting the engine body 50 on the upper portions of the both pivot plates 26 is basically the same as the above-described structure of supporting the engine body 50 on the lower portions of the pivot plates 26, and detailed description thereof will be omitted.

On intermediate portions in the vertical direction of the above-described both pivot plates 26, a front end portion of a swing arm 66 is swingably supported while interposing a support shaft 67 therebetween. A wheel axle 68 of a rear wheel WR is supported so as to be freely rotatable on rear end portions of this swing arm 66.

Power from an output shaft 69 of a transmission built in the above-described engine body 50 is one to be transmitted to the rear wheel WR through chain drive transmission means 70. The chain drive transmission means 70 is constituted of a drive sprocket 71 fixed to the above-described output shaft 69, a driven sprocket 72 fixed to the rear wheel WR, and an endless chain 73 wound around these sprockets 71 and 72, and is arranged on a left side of the engine E so that it faces forward in the direction the motorcycle is traveling.

Between the swing arm 66 and the third cross pipe 29 connecting the lower portions of the both pivot plates 26 and 26, a link mechanism 74 is provided. The link mechanism 74 includes a first link 75 rotatable around an axis of a first connecting shaft 77 parallel to the support shaft 67, in which one end portion is connected to the above-described third cross pipe 29, and a second link 76 which is connected to lower portions of the swing arm 66 so as to be rotatable around an axis of a second connecting shaft 80 parallel to the first connecting shaft 77 and is connected to the other end portion of the first link 75 while interposing therebetween a third connecting shaft 81 parallel to the first and second connecting shafts 77 and 80.

In the third cross pipe 29, a pair of bearing support portions 29a protruding rearward at two spots spaced in a longitudinal direction of the third cross pipe 29 are integrally provided. The one end portion of the first link 75 is supported on a collar 78 attached onto the first connecting shaft 77 provided between the bearing support portions 29a while interposing a pair of roller bearings 79 therebetween.

Moreover, the other end portion of the first link 75 is connected to a rear portion of the second link 76 while interposing the third connecting shaft 81 therebetween. A lower end portion of a rear cushion unit 82 of which upper end portion is connected to a bracket 66a provided in a front portion of the swing arm 66 is connected to a front portion of the second link 76 while interposing a fourth connecting shaft 83 therebetween.

Figure 10:
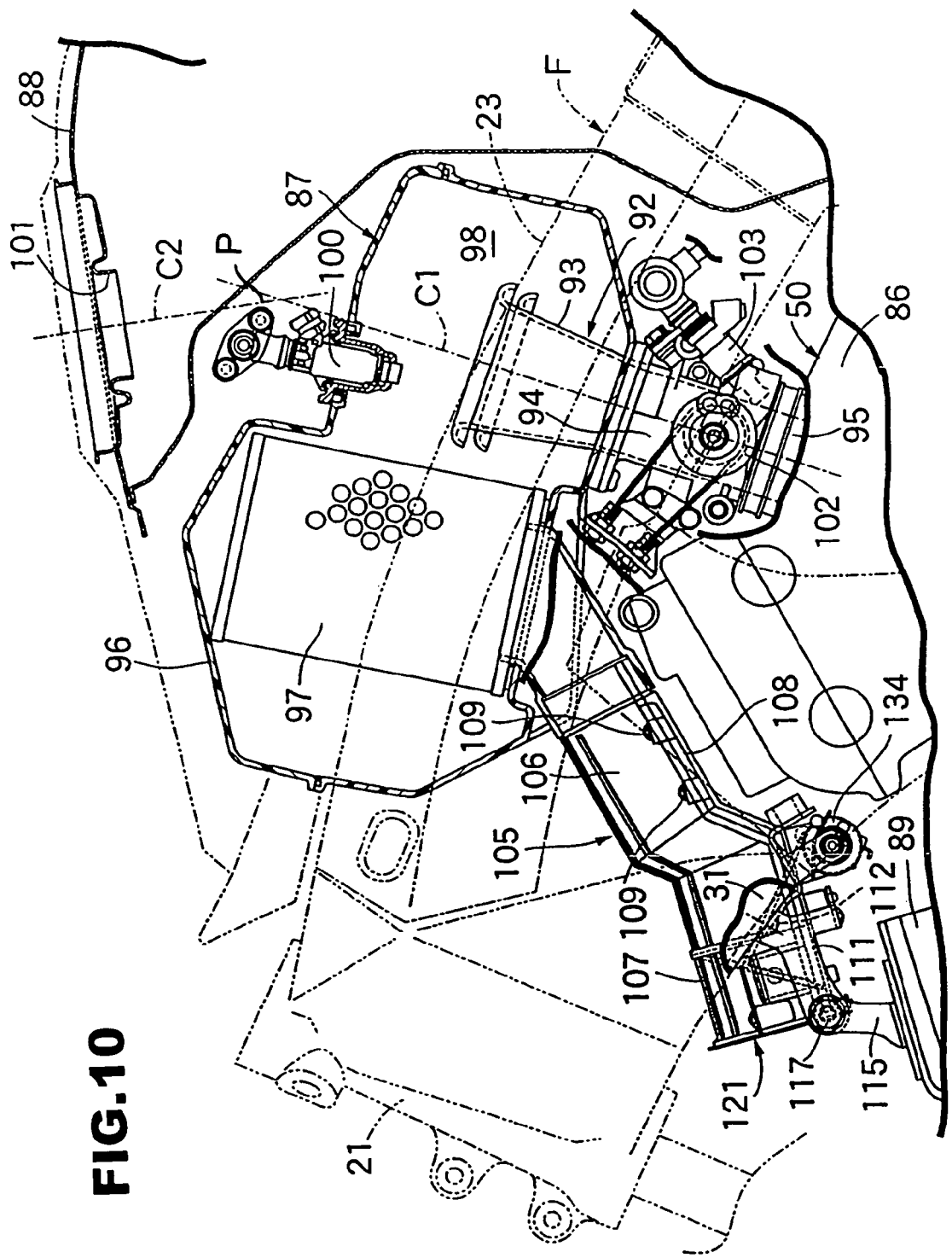
FIG. 10 is a cross-sectional view taken along line 10—10 of FIG. 6.
Figure 11:
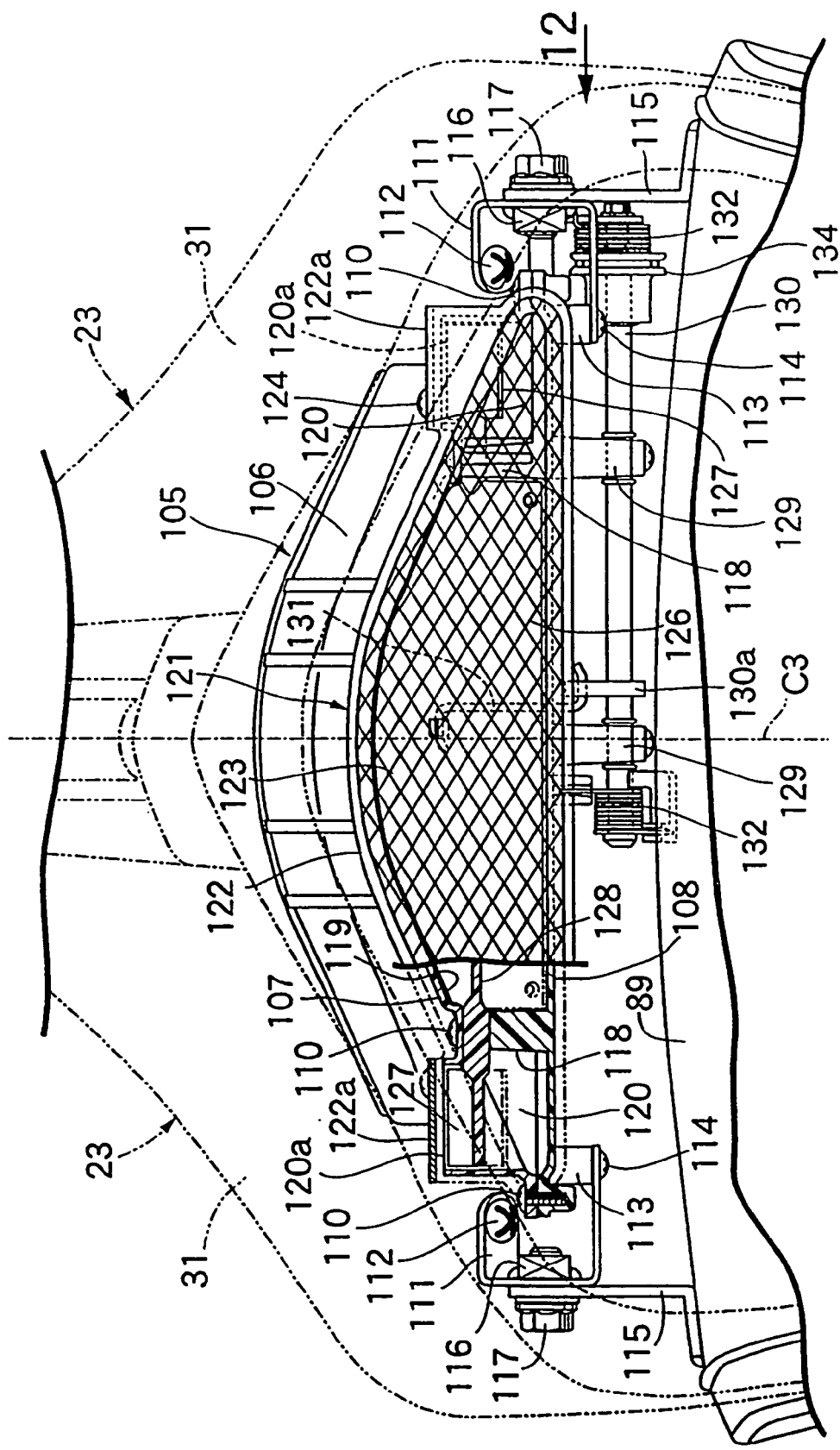
FIG. 11 is an enlarged view of a section of the motorcycle shown in FIG. 6.

With reference to FIG. 10 in addition, above a cylinder head 86 in the engine body 50, an air cleaner 87 for cleaning air to be supplied to the engine E is arranged so as to be located behind the head pipe 21 in the body frame F. A fuel tank 88 covering a rear portion and upper portion of this air cleaner 87 is mounted on the main frames 23 in the body frame F, and a radiator 89 is arranged in front of the engine body 50. As shown in FIG. 2, on the seat rails 30 behind the above-described fuel tank 88, a main seat 90 for seating a rider thereon is supported, and a pillion seat 91 for seating a rider thereon is supported on the seat rails 30 at a position spaced rearward from the main seat 90.

To an upper sidewall of the cylinder head 86, intake passage portions 92, extended straight so as to introduce the cleaned air from the air cleaner 87 above the cylinder head 86, are connected for each of the cylinders. Each of these intake passage portions 92 is one including a funnel 93 in which an open upper end portion protrudes into the air cleaner 87, and a throttle body 94 connects to a lower end of the funnel 93. The throttle body 94 is connected to the upper sidewall of the cylinder head 86 while interposing an insulator 95 therebetween.

Meanwhile, the air cleaner 87 is one formed by fixedly housing a cylindrical cleaner element 97 in a cleaner case 96. Around the cleaner element 97 in the cleaner case 96, a cleaner chamber 98 into which the air is cleaned by passing through the cleaner element 97 is formed. The funnels 93 at upstream ends of the respective intake passage portions 92 are attached in line onto the cleaner case 96 so as to open to the cleaner chamber 98.

First injectors 100 for injecting fuel when the engine E rotates at high speed are attached onto the cleaner case 96 in the air cleaner 87 for each of the cylinders of the engine E. The first injectors 100 are arranged in front of centerline C1 of the respective intake passage portions 92, and are attached onto the cleaner case 96 so as to have an axis tilted with respect to the centerline C1. In addition, an unillustrated fuel pump is built in the fuel tank 88, and the fuel is supplied from the fuel pump to the first injectors 100.

Moreover, a fuel filler 101 is provided on a front portion of the fuel tank 88. The first injectors 100 are arranged in front of a centerline C2 of the fuel filler 101. On a projection diagram onto a plane parallel to the centerline C2 of the fuel filler 101 and the centerlines C1 of the intake passage portions 92, the first injectors 100 are attached onto the cleaner case 96 such that upper portions thereof are arranged in front of intersection P of the centerlines C1 and C2.

In the throttle bodies 94 in the respective intake passage portions 92, throttle valves (not shown) for controlling amounts of intake flowing through the intake passage portions 92 are built. Throttle drums 102 connected to the throttle valves are arranged on sides of the throttle bodies 94.

In addition, on the engine E side than the above-described throttle valves and on rear sides of the throttle bodies 94, second injectors 103 receiving a supply of the fuel from the fuel pump in the fuel tank 88 and injecting the fuel in a drive state of the engine E are attached. The second injectors 103 are on a side opposite to the engine E, and are tilted to a side of centerline C1 that is the opposite of the first injectors 100.

Referring to FIGS. 11 to 14, below the head pipe 22 provided on the front end of the body frame F, an intake duct 105 for introducing external air into the air cleaner 87 is arranged so as to be extended forward from the air cleaner 87. A rear end portion of the intake duct 105 is protruded into a lower portion of the cleaner case 96 and fixed thereto so as to introduce the external air into the cleaner element 97 in the above-described air cleaner 87.

This intake duct 105 is constituted of a rear duct main body 106 having an approximately triangular lateral cross-sectional shape in which a center portion in a width direction raises upward and a lower portion is open. A front duct main body 107 has substantially the same lateral cross-sectional shape as that of the rear duct main body 106 and is joined to a front portion of the rear duct main body 106, and lower cover plate 108 closing lower opening ends of the front and rear duct main bodies 106 and 107. The intake duct 105 is formed such that a rear portion thereof is tilted rearward and upward when viewed from a side thereof. Then, the lower cover plate 108 is fastened to the rear duct main body 106 by a plurality of screw members 109, and fastened to the front duct main body 107 by a plurality of screw members 110.

To lower front surfaces of the pipe members 31 partially constituting the main frames 23 in the body frame F, support stays 111 are fixed by screw members 112. Attachment bosses 113 provided on both sides of a lower front portion of the intake duct 105 are fastened to the above-described support stays 111 by screw members 114, and thus a front portion of the intake duct 105 is supported on the body frame F. In addition, positioning pins 113a inserted through the support stays 111 are protruded from the above-described attachment bosses 113.

Moreover, the radiator 89 is arranged below the intake duct 105, and from both sides of this radiator 89, stays 115 are extended upward. Meanwhile, onto the above-described support stays 111, weld nuts 116 are fixedly attached. The bolts 117 inserted through the stays 115 and the support stays 111 are screwed and tightened to the above-described weld nuts 116, and thus the radiator 89 is supported on the body frame F.

On the lower cover plate 108 in the intake duct 105, a pair of partition walls 118 abutting on lower surfaces of upper portions of the front and rear duct main bodies 106 and 107 are provided integrally therewith. In the intake duct 105, formed are a first intake passage 119 of which center portion in a width direction is arranged on a centerline C3 in a width direction of the front wheel WF, and a left-and-right pair of second intake passages 120 arranged on both sides of the first intake passage 119, such that the first intake passage 119 and the second intake passages 120 are partitioned by the partition walls 118. A flow area of the first intake passage 119 is set larger than a total flow area of the pair of second intake passages 120.

In addition, front portions of the partition walls 118 are formed into a shape tilted so as to be separated from each other as going forward. Front end portions of the partition walls 118 abut on inner surfaces of both sidewalls of the front duct main body 107, and a front portion of the first intake passage 119 is open forward at a front end of the intake duct 105 so as to occupy the whole of a front end opening portion (air intake) of the intake duct 105. Moreover, front end opening portions (air intake) 120a of the second intake passages 120 are ones to be formed on a front end portion of the intake duct 105 so as to open to a direction different from an opening direction of the front end of the first intake passage 119. In this embodiment, the front end opening portions 120a are formed on the front duct main body 107 so as to open upward on both left-and-right sides of the front end portion of the first intake passage 119.

When viewed from front, the front end portion of the intake duct 105 is one to be formed into the approximately triangular shape such that an upper edge thereof is made to go along a lower end edge of a continuous portion of the head pipe 21 and both main frames 23 and 23 and that a lower edge portion thereof is made to go along an upper portion of the radiator 89. A grill 121 is attached onto the front end portion of the intake duct 105.

This grill 121 is one formed by supporting a circumferential edge portion of a mesh member 123 on a frame member 122 of a shape corresponding to a front end opening edge of the intake duct 105. On the frame member 122, baffle boards 122a are integrally provided and arranged at positions spaced from the above-described front end opening portions 120a while forming gaps from the front end opening portions 120a. These baffle boards 122a are fastened to both front sides of the front duct main body 107 in the intake duct 105 by screw members 124. Moreover, from a front end of the above-described lower cover plate 108, positioning pins 125 for inhibiting a lower portion of the frame member 122 from leaving from the front end portion of the intake duct 105 are protruded so as to be inserted through the lower portion of the frame member 122.

In the first intake passage 119, arranged is a butterfly-shaped first intake control valve 126 controlled to open and close in response to the number of revolutions of the engine E so as to close the front end opening portion 119c of the first intake passage 119 when the engine E rotates at low speed and so as to open the front end opening portion 119c of the first intake passage 119 when the engine E rotates at high speed (6000 r.p.m. or more). Moreover, in the second intake passages 120, arranged are butterfly-shaped second intake control valves 127 controlled to open and close in response to the number of revolutions of the engine E so as to open the front end opening portion 120a the second intake passages 120 when the engine E rotates at low speed and so as to close the front end opening portion 120a the second intake passages 120 when the engine E rotates at high speed.

Figure 20:
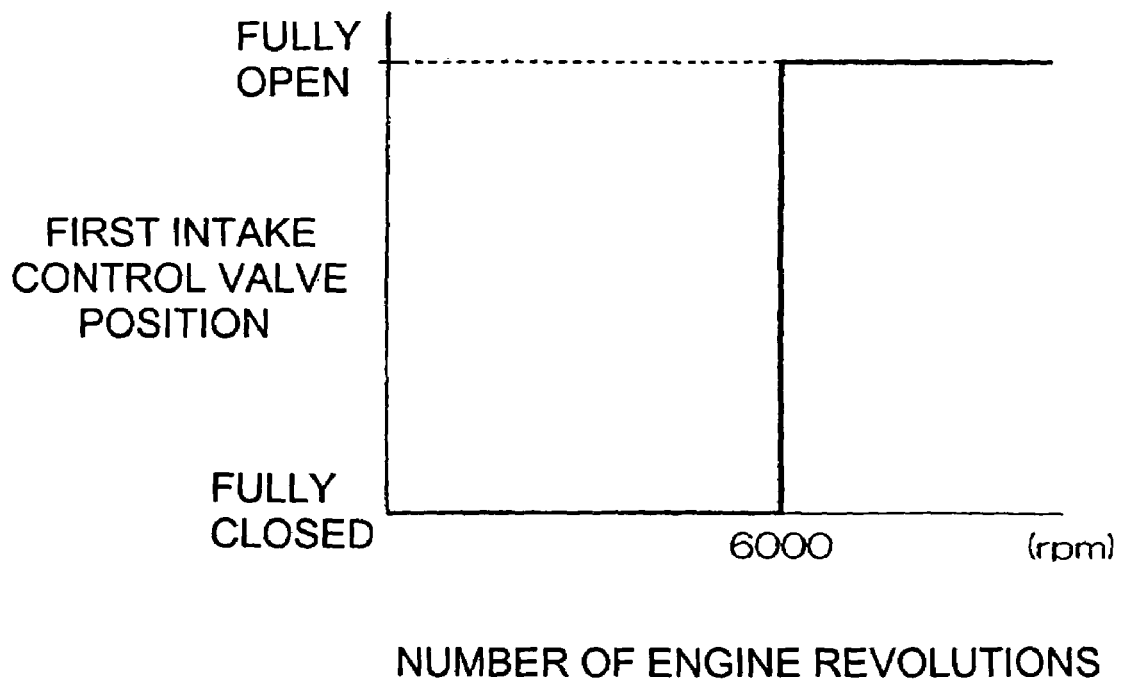
FIG. 20 is a graph showing a relationship between a first intake control valve of the present invention and a number of engine revolutions.

FIG. 20 shows a pattern where the first control valve 126 is opened and closed in response to the number of engine revolutions. In this drawing, a full close position of the first intake control valve 126 means a position shown by a solid line in FIG. 14, and a full open position thereof means a position shown by a dotted line in FIG. 14. Note that the first intake control valve 126 may be opened and closed in response to vehicle speed instead of the number of engine revolutions. For example, the first intake control valve 126 could be opened when the motorcycle reaches a fixed speed.

Figure 12:
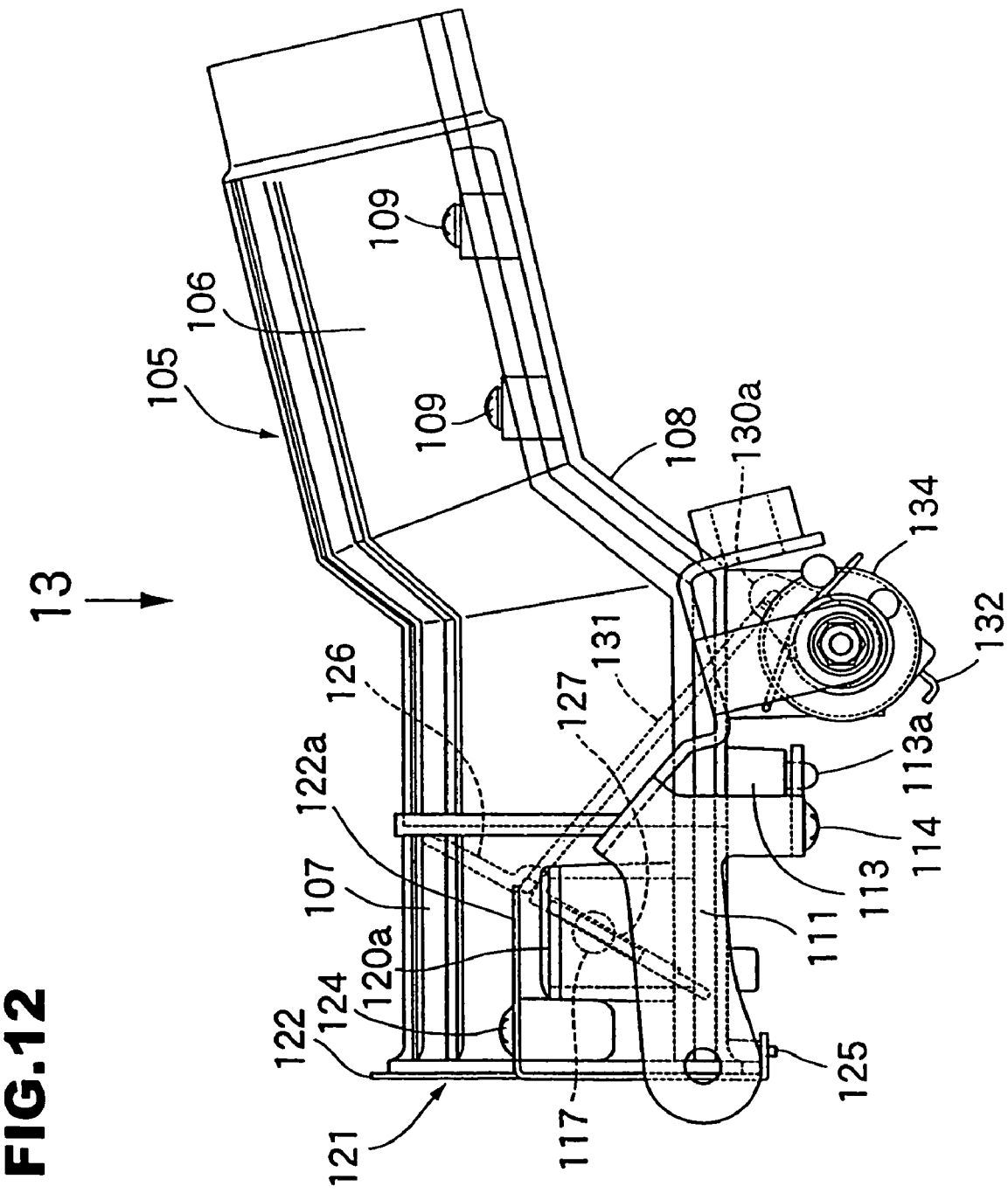
FIG. 12 is a view taken from the perspective of arrow 12 of FIG. 11.
Figure 13:
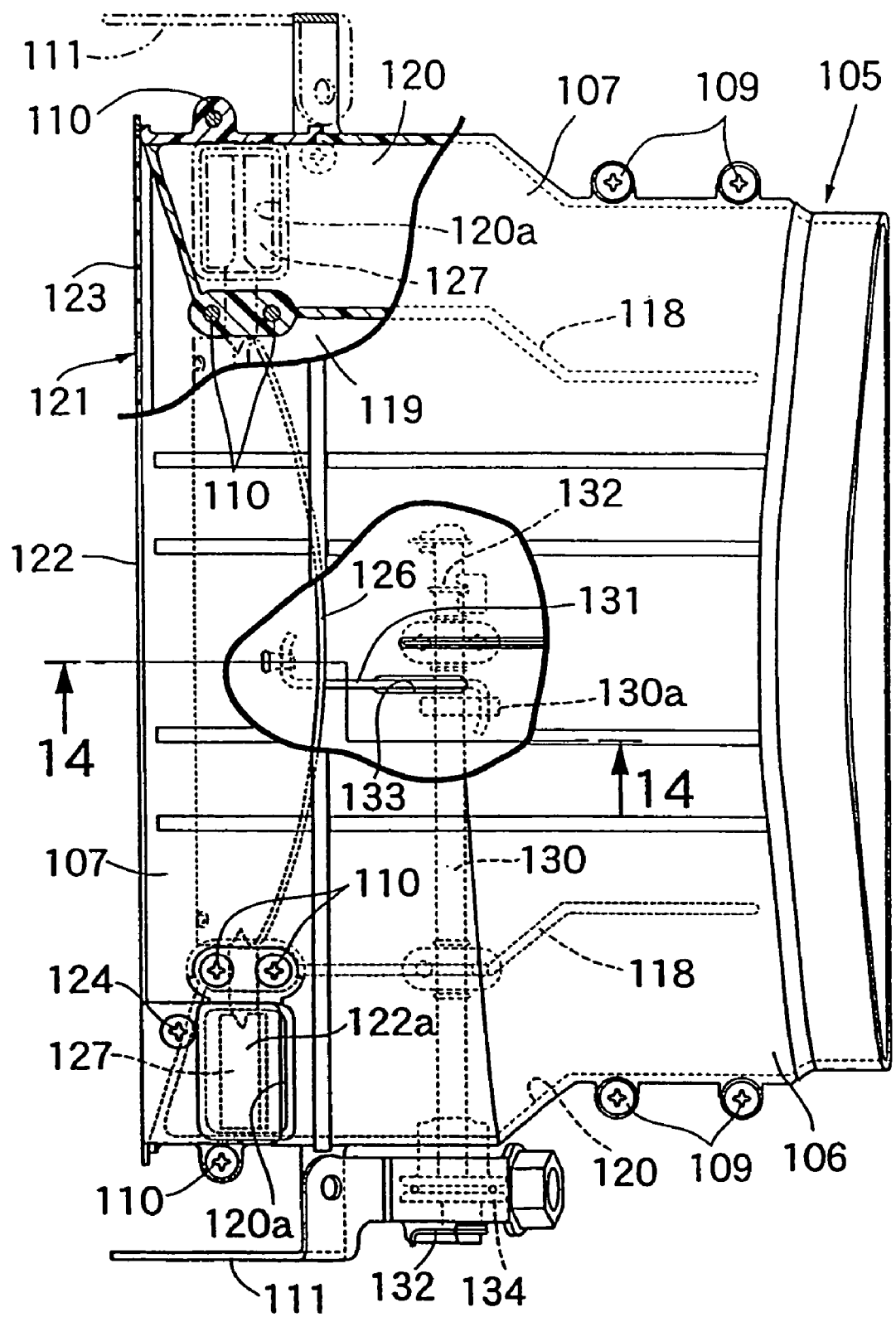
FIG. 13 is a partial cross-sectional view partially taken from the perspective of arrow 13 of FIG. 12.

Then, the first intake control valve 126 and the second intake control valves 127 commonly include a valve shaft 128 having its axis orthogonal to the flowing direction of the air flowing through the first intake passage 119 and rotatably supported in the intake duct 105, and is constituted as a valve unit (member opening and closing the air intake) VU that is a single structure. As shown in FIG. 12 the first intake control valve 126 and the second intake control valves 127 are attached in the same direction.

Hence, when the front end opening portion 119a of the first intake passage 119 is opened by the first intake control valve 126, the front end opening portions 120a of the second intake passages 120 will be closed by the second intake control valves 127. Moreover, when the front end opening portion 119a is closed by the first intake control valve 126, the front end opening portions 120a of the second intake passages 120 will be opened by the second intake control valves 127.

The valve shaft 128 is one rotatably supported by the partition walls 118 at portions corresponding to the front end opening portions 120a of the second intake passages 120 in the intake duct 105. Among the plurality of screw members 110 fastening the front duct main body 107 to the lower cover plate 108, two pairs of the screw members 110 are screwed into the partition walls 118 at positions where the screw members 110 sandwich the valve shaft 128 from both sides.

Figure 14:
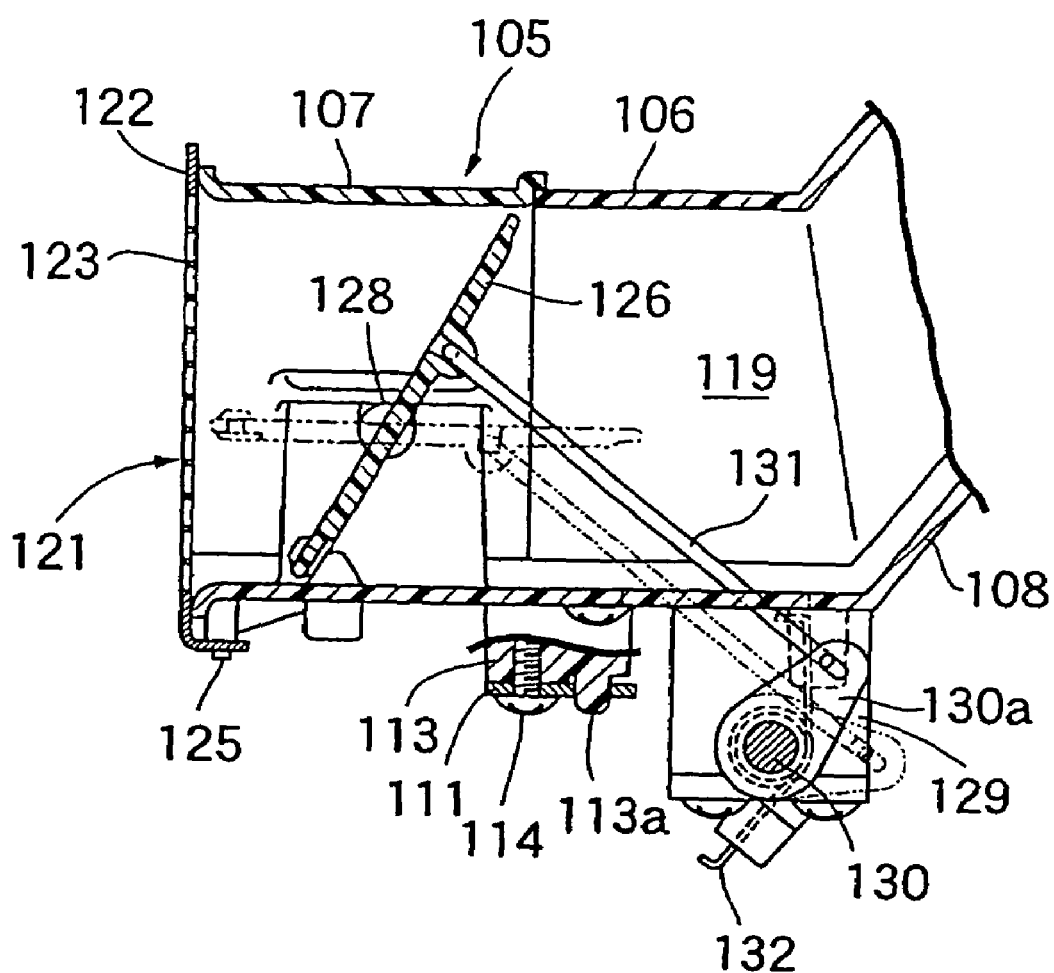
FIG. 14 is a cross-sectional view taken along a line 14—14 of FIG. 13.

The first intake control valve 126, which changes the flow area of the first intake passage 119, is fixed to the valve shaft 128 in a manner of having a posture tilted rearward and upward in a state of closing the first intake passage 119 as shown in FIG. 14. In addition, the first intake control valve 126 is formed such that, in a valve closing state thereof, an area of a portion above the above-described valve shaft 128 is set larger than an area of a portion below the above-described valve shaft 128. Moreover, the first intake control valve 126 is set substantially horizontal in a valve opening state thereof as shown by a dotted line of FIG. 14 such that resistance to the air flowing through the first intake passage 119 becomes minimum.

The second intake control valves 127 changing the flow areas of the second intake passages 120 are fixed to the valve shaft 128 so as to open the front end opening portions 120a of the second intake passages 120 in the state where the first intake control valve 126 closes the first intake passage 119.

Figure 21A:
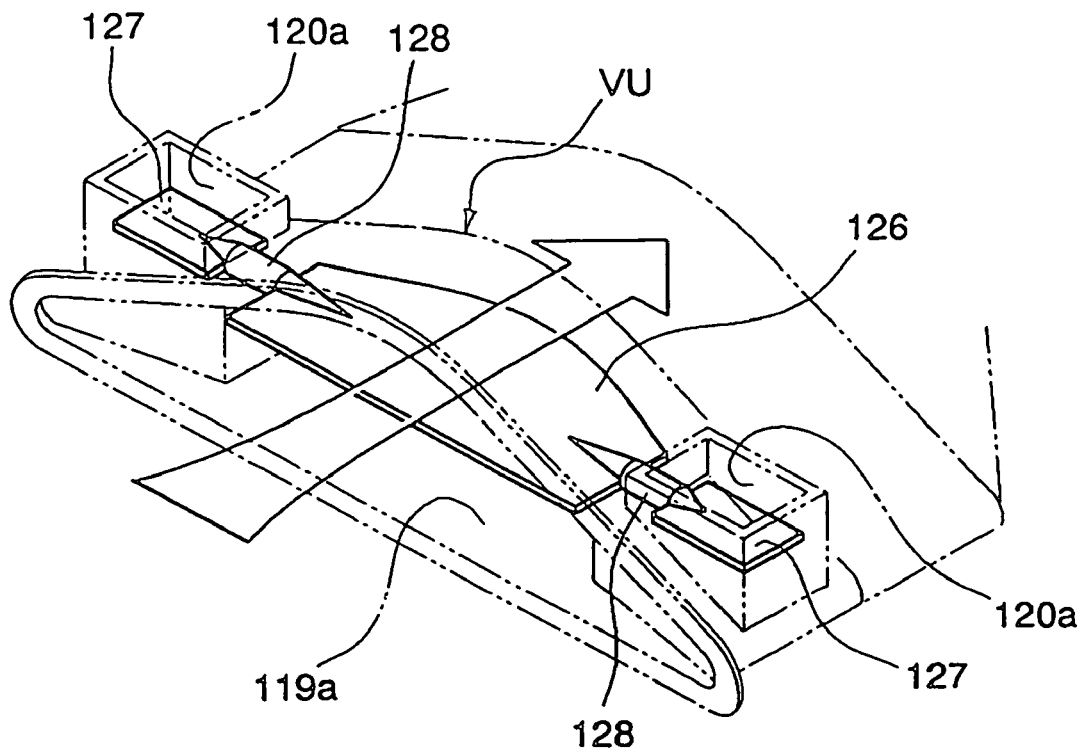
FIG. 21A shows a diagrammatic perspective view of a valve unit of the present invention during a high-speed engine operation and FIG. 21B shows a diagrammatic perspective view of a valve unit of the present invention during a low-speed engine operation.
Figure 21B:
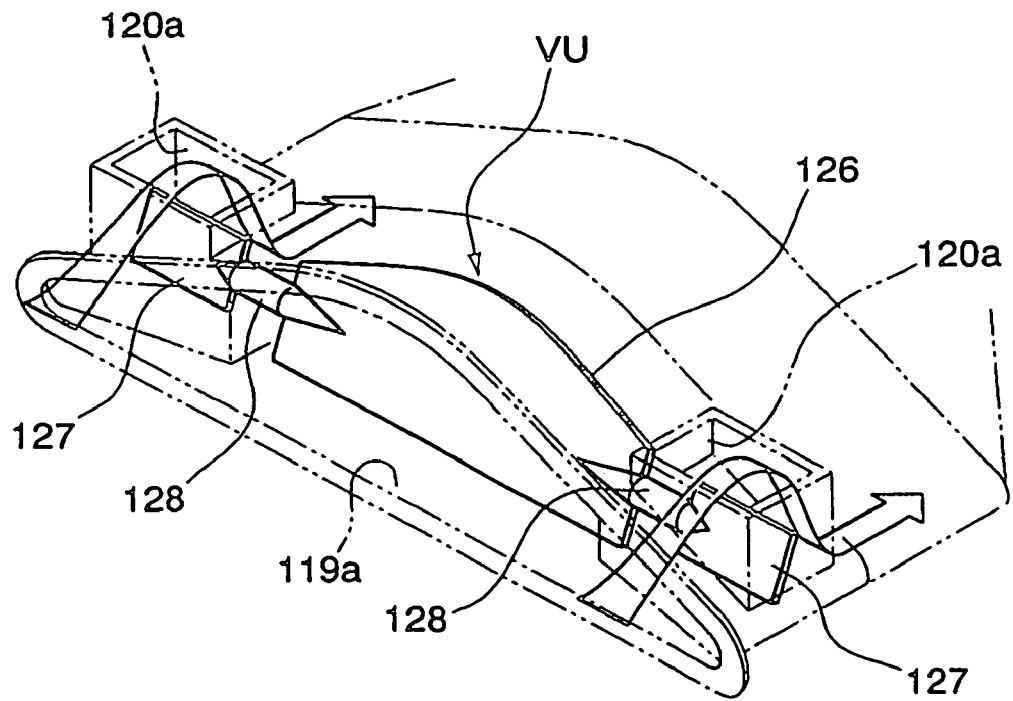
Figure 22:
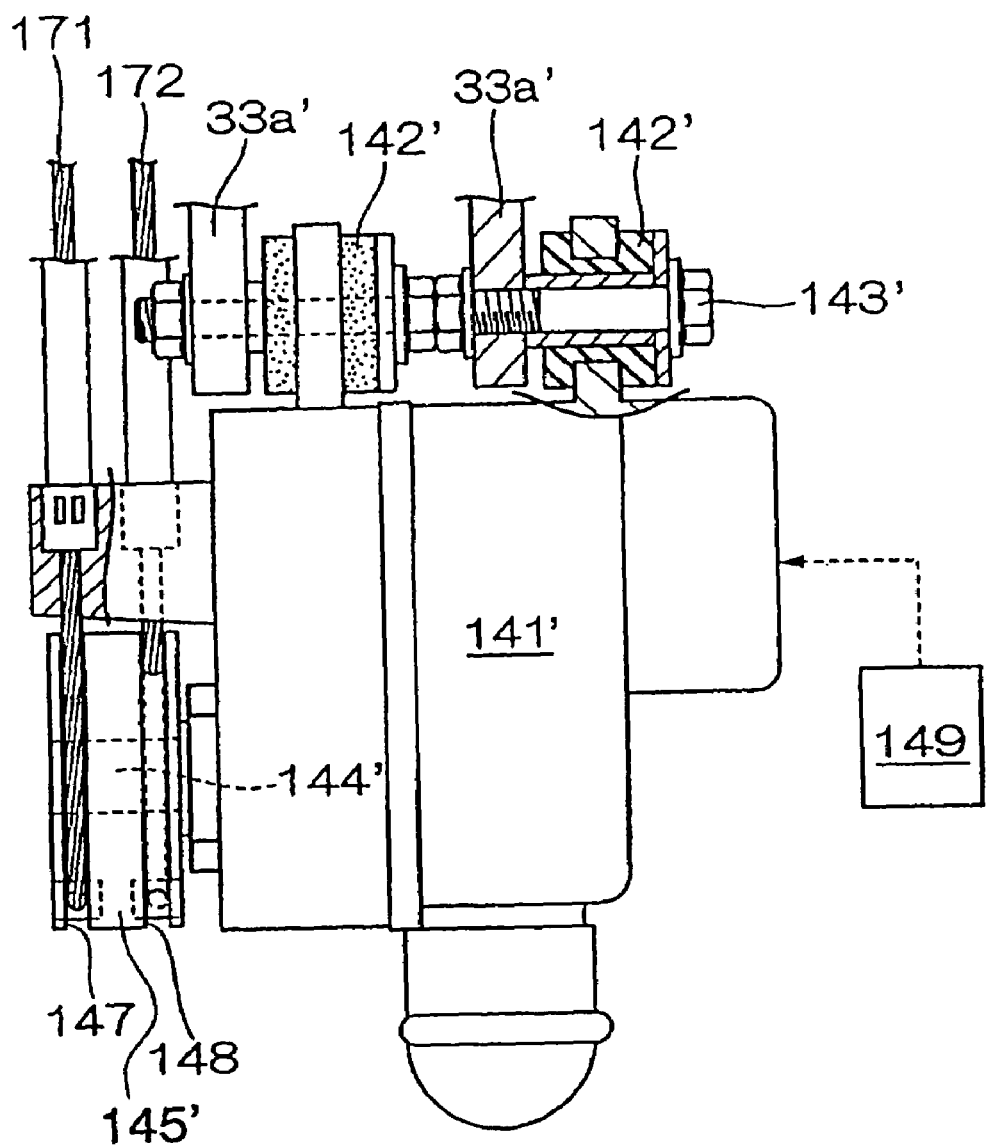
FIG. 22 is a schematic view of an actuator for an exhaust control valve of the present invention.

Hence, as shown in FIG. 21(a), when the engine E rotates at the high speed, the valve unit VU opens the first intake control valve 126 and closes the second intake control valves 127, thus introducing the external air therethrough from the front end opening portion 119a of the first intake passage 119. Meanwhile, as shown in FIG. 21(b), when the engine E rotates at the low speed, the valve unit VU closes the first intake control valve 126 and opens the second intake control valves 127, thus introducing the external air therethrough from the front end opening portions 120a of the second intake passages 120.

Behind the shaft 128 and below the intake duct 105, a rotation shaft 130 parallel to the valve shaft 128 is arranged. This rotation shaft 130 is rotatably supported by a plurality of bearing portions 129 protruded from a lower surface of the intake duct 105, that is, a lower surface of the lower cover plate 108.

An arm 130a is provided to the rotation shaft 130 at a portion corresponding to the first intake passage 119. The arm 130a is connected to one end of a connecting rod 131 penetrating the lower portion of the intake duct 105, that is, the lower cover plate 108, the other end of the connecting rod 131 being connected to a portion above the valve shaft 128 in the first intake control valve 126 in the valve closing state. Hence, the first intake control valve 126 will be rotationally driven between the valve closing position shown by a solid line of FIG. 14 and the valve opening position shown by the dotted line of FIG. 14 in response to rotation of the rotation shaft 130.

In addition, between both end portions of the rotation shaft 130 and the intake duct 105, return springs 132 are provided for exerting spring forces rotationally energizing the rotation shaft 130 and the valve shaft 128 to a direction where the first intake control valve 126 is brought to the valve closing position. Moreover, the connecting rod 131 movably penetrates a through hole 133 provided in the lower cover plate 108. This through hole 133 is formed to be long in a fore-and-aft direction so as to correspond to a position where the connecting rod 131 penetrates the lower cover plate 108 in the fore-and-aft direction in response to a rotational motion of the arm 130a together with that of the rotation shaft 130.

A driven pulley 134 is fixed to one end of the above-described rotation shaft 130. To this driven pulley 134, rotational force is transmitted through a first transmission wire 135 from an actuator 141 which is supported by one of support plate portions 33 provided on the rear portions of the main frames 23, and is arranged on an upper left side of the engine body 50.

Figure 15:
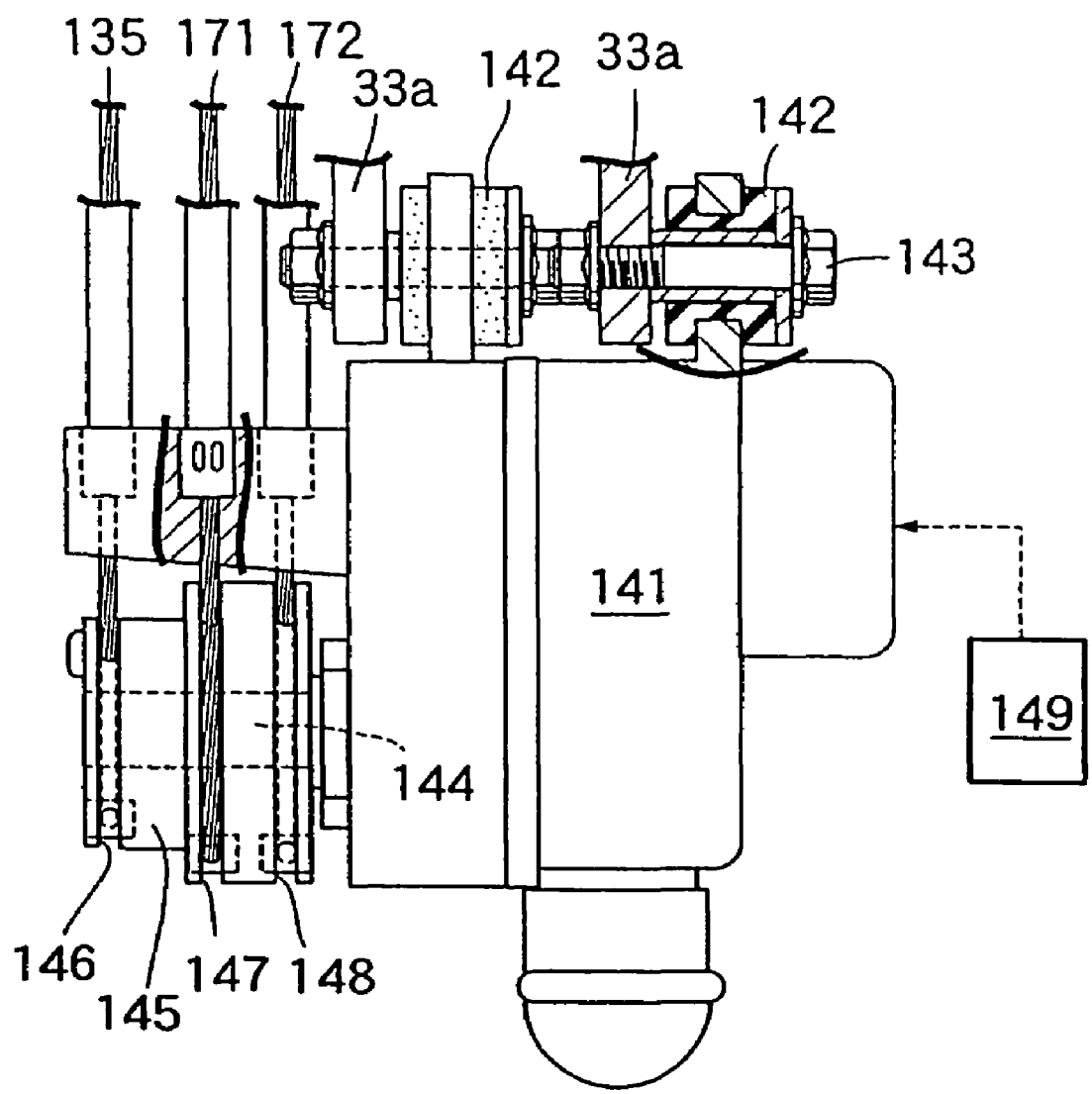
FIG. 15 is an enlarged view taken from the perspective of arrow 15 of FIG. 12.

In FIG. 15, the actuator 141 is one formed of an electric motor capable of rotating forward and reverse, and a reduction mechanism transmitting power of the electric motor at reduced speed. The actuator 141 is attached onto a pair of brackets 33a provided on one of support plate portions 33 in the body frame F by a bolt 143 while interposing elastic members 142 therebetween. On a drive pulley 145 fixedly attached onto an output shaft 144 which this actuator 141 includes, a small-diameter first wire groove 146 and large-diameter second and third wire grooves 147 and 148 are provided.

An end portion of the first transmission wire 135 for transmitting the rotational force to the driven pulley 134 on the intake duct 105 side is engaged with the first wire groove 146 so as to be wound therearound.

An electronic control unit 149 is connected to the actuator 141. The electronic control unit 141 controls an operation of the actuator 149 in response to the number of revolutions of the engine, which is inputted from an unillustrated sensor.

Another actuator 141' is shown in Figure. The above-described electronic control unit 149 is connected to the actuator 141', and the electronic control unit 149 controls the operation of the actuator 141' in response to the number of engine revolutions, which is inputted from an unillustrated sensor. Here, the other constitutions of the above-described actuator 141' are similar to those of the above-mentioned actuator 141, and accordingly, reference numerals added with "'(apostrophe)" for the same portions are added thereto, and description thereof will be omitted. Note that, in FIGS. 1 and 2, only the actuator 141 is shown, and illustration of the actuator 141' is omitted. Here, in the case of opening and closing the above-described valve unit VU in response to the number of engine revolutions E, the number of revolutions of the engine E is used as a common input signal, and accordingly, both of the valve unit VU and the exhaust control valve 156 can be driven by either one of the above-described actuator 141 and actuator 141'.

Alternately, the actuator 141 can be driven in response to a signal from a vehicle speed sensor.

Again in FIGS. 1 and 2, an exhaust system 150 continuous with the engine E includes individual exhaust pipes 151 individually connected to front sidewall lower portions of the cylinder head 86 in the cylinder body 50, a pair of first collecting exhaust pipes 152, each of which commonly connects a pair of the individual exhaust pipes 151, a single second collecting exhaust pipe 153, to which the pair of first collecting exhaust pipes 152 are commonly connected, and which has a first exhaust muffler 154 interposed in an intermediate portion thereof, and a second exhaust muffler 155 connected to a downstream end of the second collecting exhaust pipe 153.

Each of the individual exhaust pipes 151, is arranged so as to extend downward from the front of the engine body 50, and the first collecting exhaust pipes 152 are arranged below the engine body 50 so as to extend substantially in the fore-and-aft direction. Moreover, the second collecting exhaust pipe 153 is erected between the rear wheel WR and the engine body 50 while being curved so as to go from below the engine body 50 toward the right side of the vehicle body, and is further extended rearward above the rear wheel WR. Then, the first exhaust muffler 154 is interposed in the erected portion of the second collecting exhaust pipe 153, and a rear end exhaust portion of the exhaust system 150, that is, the downstream end portion of the second exhaust muffler 155 is arranged at a position above the wheel axle 68 of the rear wheel WR.

Figure 16:
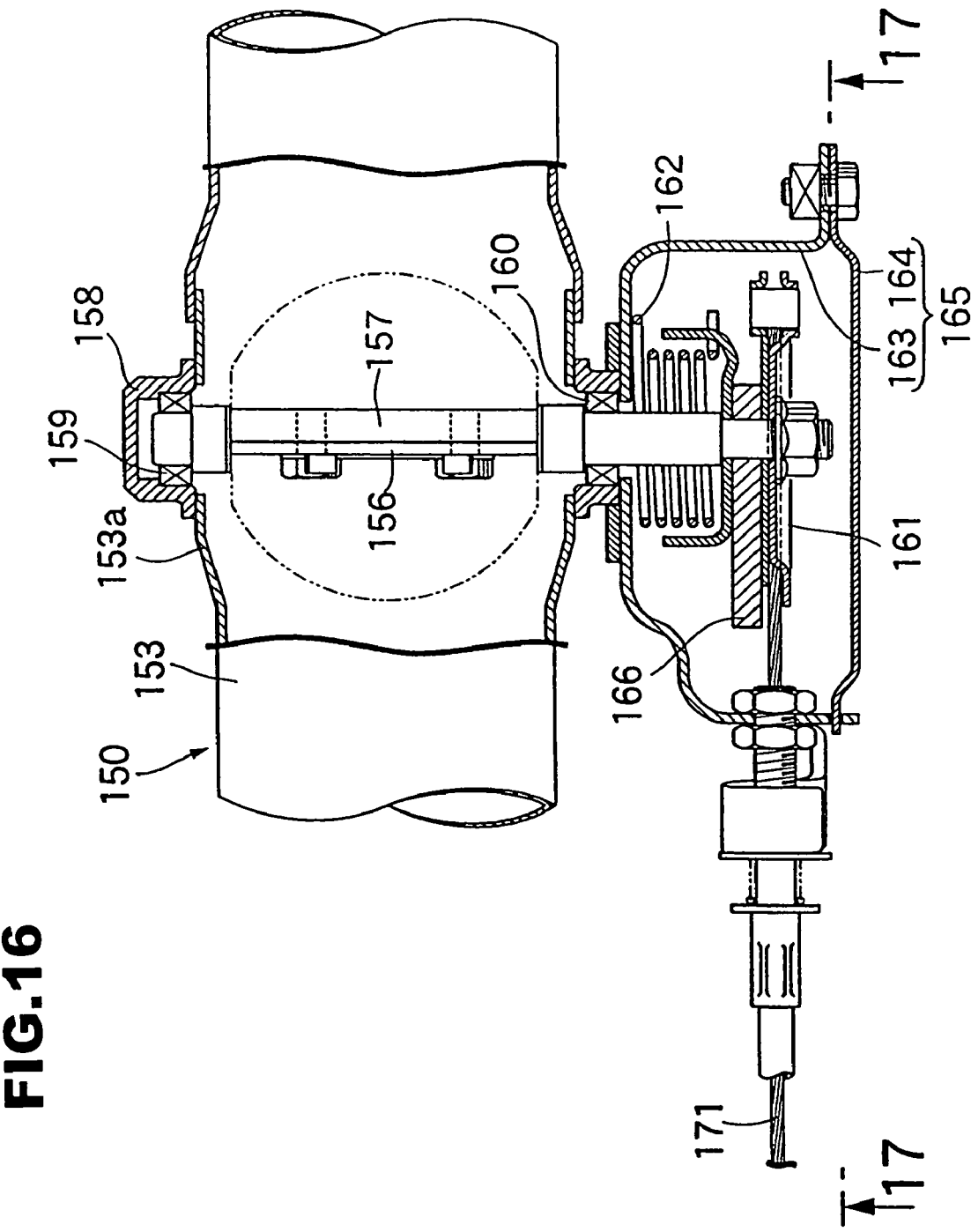
FIG. 16 is an enlarged cross-sectional view taken along line 16—16 of FIG. 2.
Figure 17:
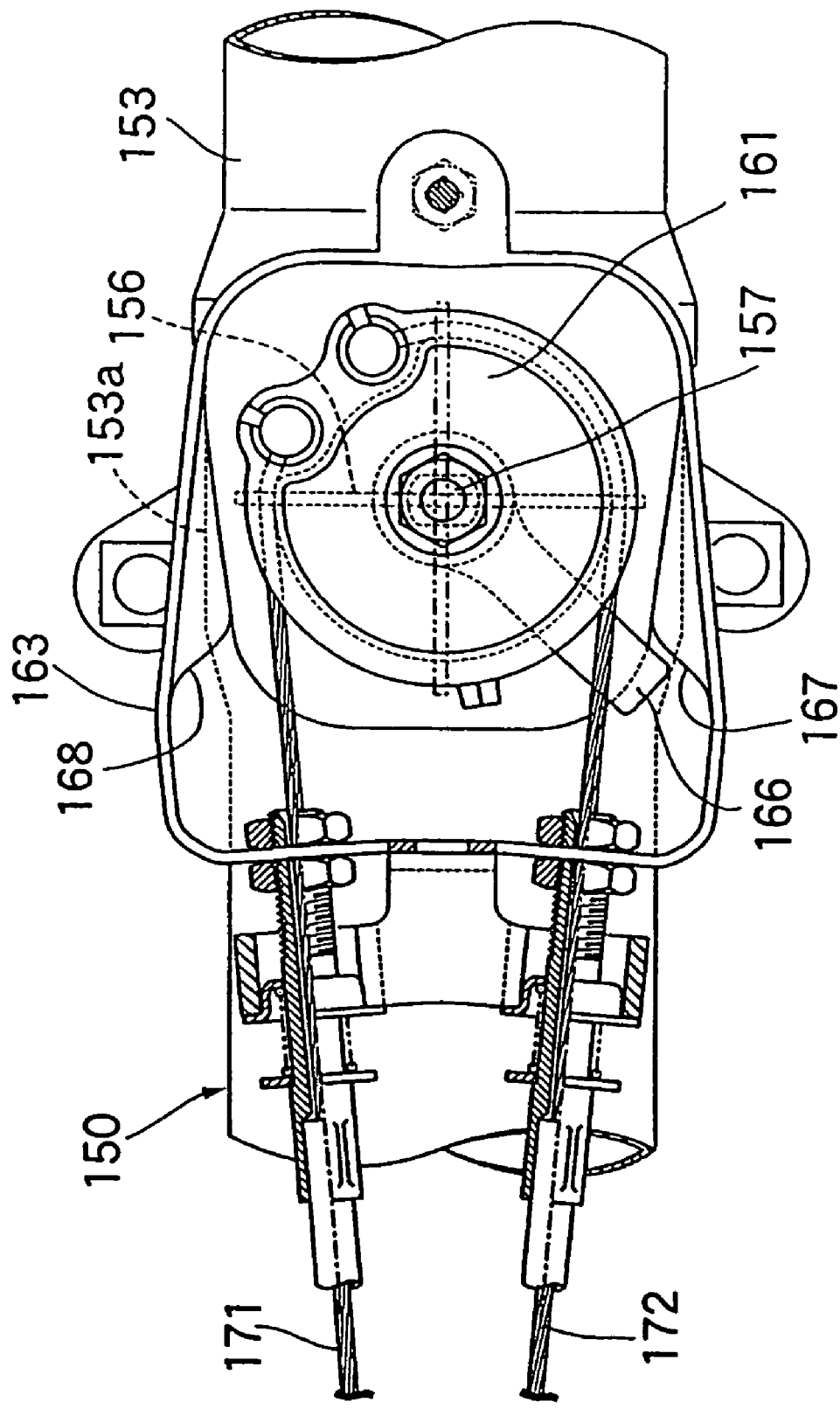
FIG. 17 is a cross-sectional view taken along line 17—17 of FIG. 16.

Referring to FIGS. 16 and 17, in the second collecting exhaust pipe 153 constituting a part of the exhaust system 150, at a portion located in front of and above the wheel axle 68 of the above-described rear wheel WR, a wide portion 153a is provided. In this wide portion 153a, an exhaust control valve 156 is provided as an operating member for controlling exhaust pulses in the exhaust system 150 by changing a flow area in the second collecting exhaust pipe 153 in response to the number of revolutions of the engine E.

The exhaust control valve 156 operates to a closing side in low/middle-speed rotation ranges of the engine E in order to achieve power enhancement of the engine E by use of an exhaust pulse effect in the exhaust system 150, and operates to an opening side in a high-speed rotation range of the engine E in order to achieve the power enhancement of the engine E by reducing exhaust flow resistance in the exhaust system 150. The exhaust control valve 156 is fixed to a valve shaft 157 rotatably supported in the wide portion 153a of the second collecting exhaust pipe 153.

One end of the valve shaft 157 is supported on a bottom-having cylindrical bearing housing 158 fixedly attached onto the diameter-expanded portion 153a while interposing a seal member 159 therebetween. Onto the other end portion of the valve shaft 157, which protrudes from the diameter-expanded portion 153a while interposing a seal member 160 between the same other end portion and the wide portion 153a, a driven pulley 161 is fixed. Between the valve shaft 157 and the wide portion 153a, a return spring 162 is provided to energize the above-described valve shaft 157 to the side of the opening of the exhaust control valve 156.

The protruding portion of the valve shaft 157 from the above-described wide portion 153a, the driven pulley 161 and the return spring 162 are housed in a case 165 formed of a cup-shaped case body 163 fixed to the wide (diameter-expanded) portion 153a, and a cover plate 164 fastened to the case body 163 so as to close an open end of the case body 163.

In addition, in the case 165, a regulator arm 166 of which tip end portion protrudes from an outer circumference of the driven pulley 161 is fixed to the valve shaft 157. On an inner surface of the case body 163 in the case 165, there is provided a closing-side stopper 167 making the tip end portion of the regulator arm 166 abut thereon, thus regulating a rotating end of the valve shaft 157 (that is, of the exhaust control valve 156 to the closing side). There is also an opening-side stopper 168 making the tip end portion of the regulator arm 166 abut thereon, thus regulating the rotating end of the valve shaft 157 (that is, of the exhaust control valve 156 to the opening side).

One end portion of a second transmission wire 171 operating the above-described exhaust control valve 156 to the closing side when being pulled is engaged with the driven pulley 161 so as to be wound therearound. One end portion of a third transmission wire 172 operating the above-described exhaust control valve 156 to the opening side when being pulled is engaged with the driven pulley 161 so as to be wound therearound. As shown in FIG. 15, the other end portion of the second transmission wire 171 is engaged with the second wire groove 147 of the drive pulley 144 in the actuator 141 so as to be wound therearound from a direction reverse to a winding direction of the first transmission wire 135. As shown in FIG. 15, the other end portion of the third transmission wire 172 is engaged with the third wire groove 148 of the drive pulley 144 so as to be wound therearound from the same direction as the winding direction of the first transmission wire 135.

Specifically, the actuator 141 for driving the exhaust control valve 156 controlled in response to the number of revolutions of the engine E will be connected to the first intake control valve 126 in the intake duct 105 in order to rotationally drive the first intake control valve 126.

In the second collecting exhaust pipe 153, it is desirable that the wide portion 153a, in which the exhaust control valve 156 is provided, be arranged below the main seat 90 in order to avoid undesired external force from the above operating onto the second and third transmission wires 171 and 172 as much as possible. Moreover, the case 165 is arranged so as to be exposed to the outside when viewed from a side in order to be facilitated to be blown by a running wind.

It is desirable that the above-described actuator 141 be arranged behind and above the engine body 50 at a position where a distance between the actuator 141 and the valve shaft 128 in the intake duct 105 and a distance between the actuator 141 and the valve shaft 157 of the exhaust control valve 156 become substantially equal to each other. In such a way, obstructions interposed between the driven pulley 161 of the exhaust control valve 156 and the actuator 141 are reduced, and cabling of the second and third transmission wires 171 and 172 connecting the above-described pulley 161 and actuator 141 can be facilitated.

Figure 18:
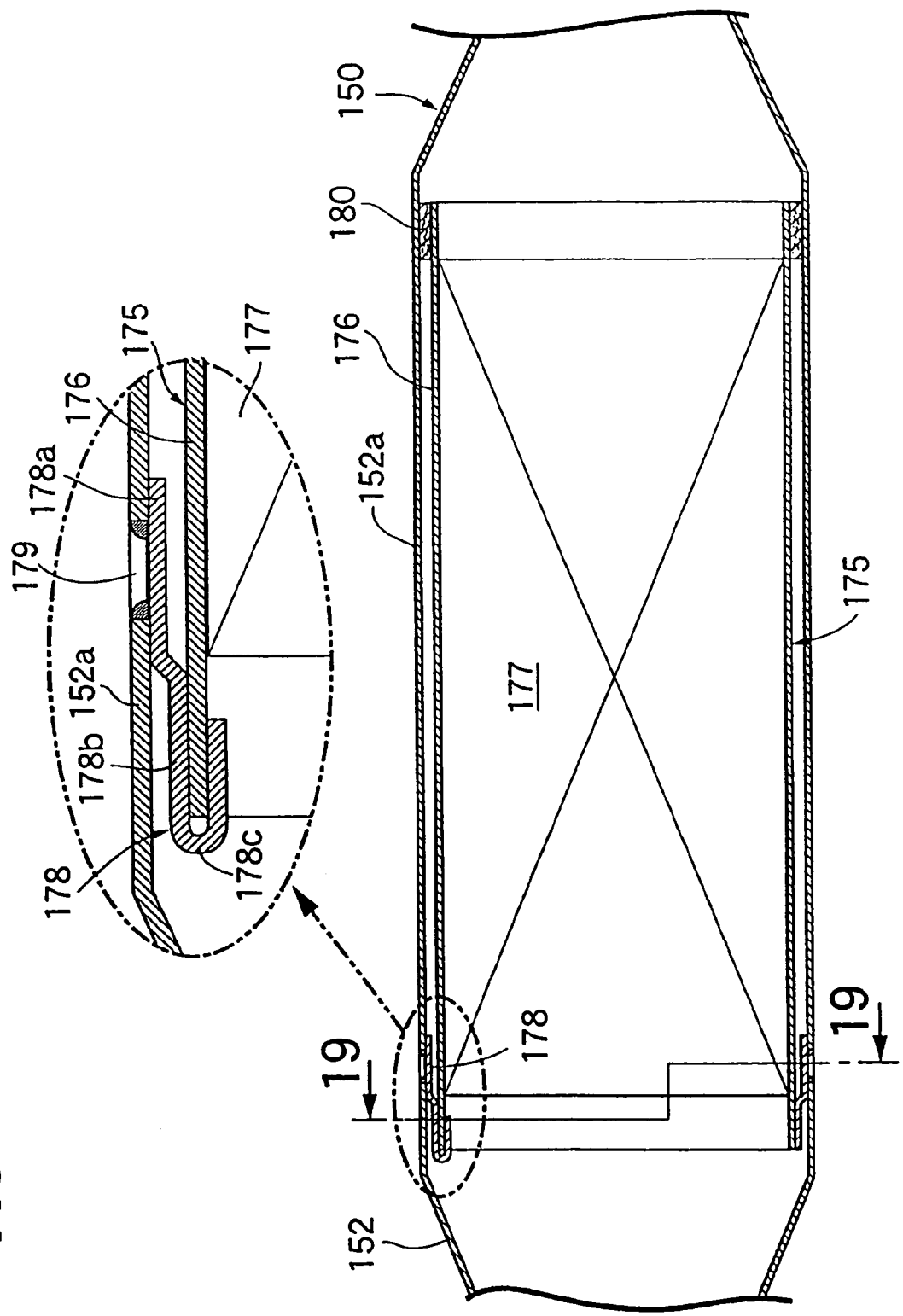
FIG. 18 is an enlarged cross-sectional view taken along line 18—18 of FIG. 2.
Figure 19:
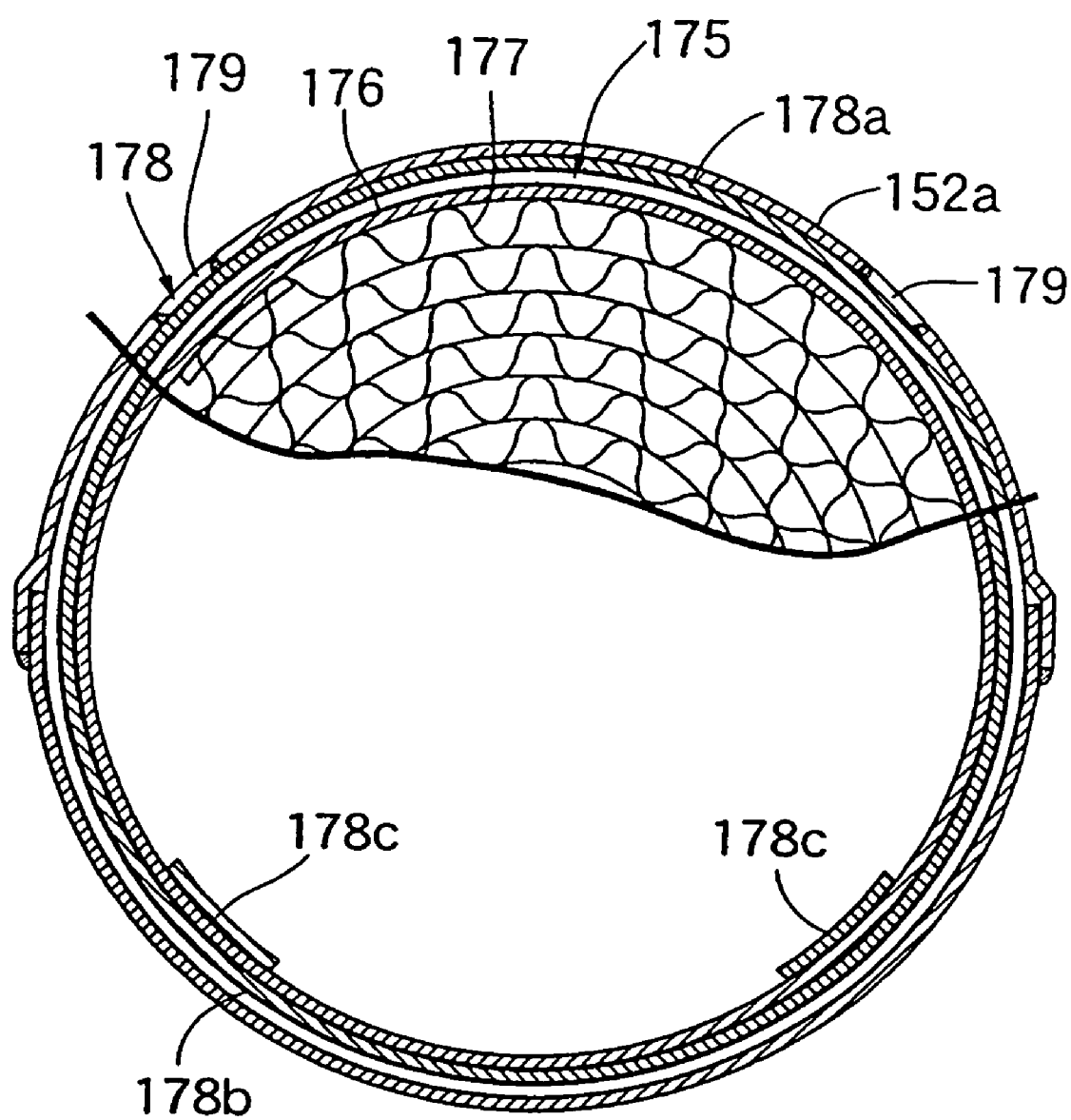
FIG. 19 is a cross-sectional view taken along line 19—19 of FIG. 18.

In FIGS. 18 and 19, in the first collecting exhaust pipes 152 constituting a part of the exhaust system 150, wide portions 152a are provided at positions located below the engine body 50. Catalyst bodies 175 are housed in these wide (diameter-expanded) portions 152a. When the catalyst bodies 175 are arranged below the engine body 50 as described above, it is possible that exhaust gas discharged from the cylinder head 86 flows through the catalyst bodies 175 while being kept at relatively high temperature.

Each of the catalyst bodies 175 is formed in a manner that a catalyst carrier 177 allowing the flow of the exhaust gas through a cylindrical case 176 and formed in a circular column shape is housed in the case 176 while arranging one end thereof inward of one end of the case 176. The case 176 is formed of a material different from that of the first collecting exhaust pipes 152. For example, while each first collecting exhaust pipe 152 is made of titanium, each case 176 and catalyst carrier 177 of the catalyst body 175 is made of stainless steel.

To an inner circumferential surface of the wide (diameter-expanded) portion 152a in the first collecting exhaust pipe 152, a bracket 178 made of the same material as that of the first collecting exhaust pipe 152, for example, titanium, is welded. This bracket 178 integrally has a large ring portion 178a surrounding the one end portion of the case 176 and fitted into the diameter-expanded portion 152a, a small ring portion 178b continuous with the large ring portion 178a in a manner of fitting the one end of the case 176 thereinto, and extended arm portions 178c, extended from a plurality of spots of the small ring portion 178b, for example, for spots at an equal interval in a circumferential direction to a side opposite to the large ring portion 178a.

Through holes 179 are provided on a plurality of spots in the circumferential direction of the wide (diameter-expanded) portion 152a so as to be made to face an outer circumferential surface of the large ring portion 178a. The large ring portion 178a is welded to the wide portion 152a through these through holes 179, and thus the bracket 178 is welded to the wide portion 152a of the first collecting exhaust pipe 152. Moreover, the respective extended arm portions 178c, are ones to be crimped to the one end of the case 176 in the catalyst carrier 175. The bracket 178 welded to the wide portion 152a of the first collecting exhaust pipe 152 will be crimped to the one end of the case 176 at portions protruding from one end of the catalyst carrier 177.

Moreover, onto an outer surface at the other end of the case 176 in the catalyst body 175, a ring 180 formed of stainless mesh is fixedly attached by spot welding. This ring 180 is interposed between the wide portion 152a of the first collecting exhaust pipe 152 and the other end portion of the case 176. Thus, it is made possible that the other end side of the catalyst carrier 175 in which the one end side is fixed to the wide portion 152a while interposing the bracket 178 therebetween slides due to thermal expansion. A stress due to the thermal expansion of the catalyst carrier 175 can be avoided between the one end portion of the catalyst body 175 and the wide portion 152a.

With another reference to FIG. 1, front of the head pipe 22 is covered with a front cowl 181 made of synthetic resin. Both front sides of the vehicle body are covered with center cowls 182 made of the synthetic resin, which are continuous with the front cowl 181. A lower cowl 183 made of the synthetic resin, which covers the engine body 50 from both sides is provided continuously with the center cowls 182. Moreover, rear portions of the seat rails 30 are covered with a rear cowl 184.

A front fender 185 covering the above of the front wheel WF is attached onto the front fork 21, and a rear fender 186 covering the above of the rear wheel WR is attached onto the seat rails 30.

Next, the operation of one embodiment of the present invention will be described. The first cross pipe 27 is hung across the front portions of the left-and-right pair of main frames 23 provided continuously with the head pipe 22 at the front end in the body frame F. The attachment holes 32 are coaxially provided on the front inner walls of the main frames 23. The both end portions of the first cross pipe 27 inserted into these attachment holes 32 are welded to the inner walls of the both main frames 23. Hence, insertion amounts of the both end portions of the first cross pipe 27 into the attachment holes 32 are changed, and thus a dimensional error between the left-and-right pair of main frames 23 and a length error in an axial direction of the first cross pipe 27 are absorbed, and the end portions of the first cross pipe 27 can be securely welded to the inner walls of the main frames 23 and 23.

Moreover, the head pipe 22 is one integrally including the cylinder portion 22a steerably supporting the front fork 21, and the left-and-right pair of gussets 22b and 22b extended rearward and downward from the cylinder portion 22a. The main frames 23 are ones including at least the gussets 22b, and the pipe members 31 individually welded to these gussets 22b. To the gussets 22b, the extended portions 22c extended rearward so as to be arranged inward than the front inner walls of the pipe members 31 are provided integrally therewith so as to constitute the front inner walls of the main frames 23. In addition, in the both extended portions 22c, the attachment holes 32 inserting the end portions of the first cross pipe 27 therethrough so as to oppose the ends to the front inner walls of the pipe members 31 are provided, and the end portions of the first cross pipe 27 are welded to the outer surfaces of the extended portions 22c of the first cross pipe 27. Specifically, the end portions of the first cross pipe 27 are welded to the outer surfaces of the extended portions 22c integral with the gussets 22b partially constituting the both main frames 23. Accordingly, welding the first cross pipe 27 to the main frames 23 is facilitated, and in addition, an exterior appearance can be improved because the welded portions are not visible from the outside.

Moreover, each pipe member 31 is formed into the vertically long square cylinder shape having the inner wall 31a flat across substantially the whole length in the vertical direction and the outer wall 31b substantially along the inner wall 31a, and is bent in the plane PL orthogonal to the inner wall 31a. Accordingly, it is easy to bend the pipe members 31.

In addition, the both pipe members 31 are provided continuously with the gussets 22b of the head pipe 22 in a tilted manner to the side of coming closer to each other in an upward direction. Accordingly, with a simple structure of just tilting the pipe members 31, a space between the lower portions of the both pipe members 31 is widened, and thus a space for arranging the engine E can be sufficiently ensured. Moreover, a distance between the upper portions of the both pipe members 31 is narrowed, and thus it is less likely that the knees of a rider will contact pipe members 31.

In case of supporting the engine body 50 on the upper and lower portions of the pivot plates 26 in the body frame F, in one of the pivot plates 26, there are provided the insertion hole 53 inserting the mount bolt 52 therethrough, and the first engaging portion 54 surrounding the outer end of the insertion hole 53 so as to engage therewith the bolt head portion 52a on the one end of the mount bolt 52. In the other pivot plate 26, the screw hole 57 coaxial with the insertion hole 53, and the second engaging portion 58 surrounding the outer end of the screw hole 57 are provided. The cylindrical bolt 60 is screwed to the screw hole 57 so as to sandwich the engine body 50 between the one end thereof and the inner side face of one of the pivot plates 26 and to locate the other end inward of the second engaging portion 58. The nut 63 capable of being engaged with the second engaging portion 58 is screwed to the other end portion of the mount bolt 52 inserted through the insertion hole 53, the engine body 50, the cylindrical bolt 60 and the screw hole 57 and protruding from the screw hole 57.

With such a support structure of the engine body 50 on the body frame F, a screwing position of the cylindrical bolt 60 to the screw hole 57 is adjusted, and thus the engine body 50 can be securely sandwiched between the one of the pivot plates 26 and the one end of the cylindrical bolt 60 while absorbing a dimensional error between the both pivot plates 26 and a dimensional error in the width direction of the engine body 50. In addition, the bolt head portion 52a on the one end of the mount bolt 52 is engaged with the first engaging portion 54 of the one of the pivot plates 26, and the nut 63 screwed to the other end portion of the mount bolt 52 is engaged with the second engaging portion 58 of the other pivot plate 26. Accordingly, the both ends of the mount bolt 52 can be fastened to the body frame F such that a position thereof in the axial direction is accurately determined, and support rigidity for the engine body 50 can be enhanced.

Moreover, the cylindrical check bolt 61 abutting on the other end of the cylindrical bolt 60 is screwed to the screw hole 57 so as to be located inward of the second engaging portion 58. Accordingly, the check bolt 61 is brought into contact with the other end surface of the cylindrical bolt 60, and thus the cylindrical bolt 60 can be effectively prevented from being loosened.

To the upper sidewall of the cylinder head 86 which the engine body 50 includes, the intake passage portions 92 extended straight so as to introduce the cleaned air from the air cleaner 87 arranged above the cylinder head 86 are connected. The first injectors 100, which inject fuel into the intake passage portions 92 from above the same, are attached onto the cleaner case 96 of the air cleaner 87. The fuel tank 88 is arranged so as to cover the rear portion and upper portion of the air cleaner 87. The first injectors 100 are arranged in front of the centerline C1 of the intake passage portions 92.

Specifically, the first injectors 100 will be arranged at the positions offset to front from the centerline C1 of the intake passage portions 92. On the centerline C1 of the intake passage portions 92, it is possible to set a bottom wall of the fuel tank 88 on a relatively low position while avoiding interference with the first injectors 100. Hence, the volume of the fuel tank 88 can be increased or at least easily accounted for.

Moreover, the first injectors 100 are arranged in front of the centerline C2 of the fuel filler 101 provided on the front portion of the fuel tank 88, and, therefore, the first injectors 100 do not interfere with the fuel tank 88. Accordingly, the fuel filler 101 can be set at a lower position. In addition to this, on the projection diagram onto the plane parallel to the centerline C2 of the fuel filler 101 and the centerlines C1 of the intake passage portions 92, the first injectors 100 are attached onto the cleaner case 96 of the air cleaner 87 such that the upper portions thereof are arranged in front of the intersections P of the centerlines C1 and C2. Accordingly, it is possible to set the bottom wall of the fuel tank 88 on the lower position in front of the centerline C2 of the fuel filler 101, and it is also possible to more easily ensure the volumes of the fuel tank 88 and air cleaner 87 are adequate. In addition, it also makes the insertion of a fuel service nozzle into the fuel tank at the time of fueling easier.

Furthermore, onto the rear sides of the throttle bodies 94 in the intake passage portions 92, the second injectors 103 injecting the fuel into the intake passage portions 92 are attached. Accordingly, the first injectors 100 injecting the fuel from above the intake passage portions 92 in order to contribute to the power enhancement of the engine E so as to be supplied with fuel of relatively low temperature, and the second injectors 103 capable of injecting the fuel in good response to the drive of the engine E, can be arranged by effectively using with good balance the space for arranging the intake passage portions 92.

The intake duct 105 extended forward from the air cleaner 87 arranged on the head pipe 22 on the front end of the body frame F is arranged below the head pipe 22. In this intake duct 105, formed are the first intake passage 119 of which center portion in the width direction is arranged on the centerline C3 in the width direction of the front wheel WF, and the left-and-right pair of second intake passages 120 arranged on the both sides of the first intake passage 119, such that the flow area of the first intake passage 119 is set larger than the total flow area of the pair of second intake passages 120. The first intake control valve 126 closing the first intake passage 119 when the engine E rotates at low speed is arranged in the first intake passage 119 so as to open the front end position 119a of the first intake passage 119 when the engine E rotates at high speed.

With such a constitution of the intake duct 105, when the engine E operates at low speed, that is, when running the motorcycle at low speed on a road with, for example, standing water or other foreign objects that may be splashed or ricocheted towards the intake duct log, the first intake passage 119 of which center portion in the width direction is arranged on the centerline C3 in the width direction of the front wheel WF is closed. Accordingly, the water or foreign objects can be largely prevented from entering the air cleaner 87. Moreover, when the engine E rotates at high speed, it is difficult for the water to be splashed upward or the foreign objects to be ricocheted upward due to the wind moving from the front of the vehicle. Accordingly, the water or foreign objects can be largely prevented from entering the air cleaner 87. Furthermore, at higher speeds, the first intake passage 119 of which flow area is large opens to introduce the air of a relatively large volume into the air cleaner 87, thus making it possible to contribute to the power enhancement of the engine.

Moreover, when the vehicle runs at low speed as described above, that is, when the engine E rotates at low speed, the first intake control valve 126 is closed, thus making it possible to reduce a suction noise. Note that, when the first intake passage 119 is opened as described above, the second intake passages 120 and 120 are closed, and accordingly, the water and foreign objects can be prevented from entering these portions.

Here, the ram air effect is one, in which the intake air is positively supplied to combustion chambers so as to be forced thereinto by wind pressure, and thus an amount of the intake air is increased and charging efficiency is increased to obtain ideal intake performance, thus making it possible to achieve a power enhancement of the engine E.

Moreover, to the valve shaft 128 rotatably supported in the intake duct 105, fixed are the first intake control valve 126 and the pair of second intake control valves 127 individually changing the flow areas of the second intake passages 120 so as to individually open the front end positions 120a of the second intake passages 120 when the engine E rotates at low speed and so as to individually close the front end portions 120a of the second intake passages 120 when the engine E rotates at high speed.

The first intake control valve 126 and the second control valves 127 are controlled to open and close as described above. Thus, an intake amount is restricted to be small when the engine E operates at low speed, and thus it is possible to obtain good acceleration performance by supplying an appropriately rich mixture to the engine E while restricting the mixture from being lean at the time of an acceleration operation. Moreover, volume efficiency of the engine E is enhanced by reducing intake resistance when the engine E operates at high speed, thus making it possible to contribute to a higher power performance. In addition, the first intake control valve 126 and the pair of second intake control valves 127 can be driven to open and close by rotationally driving the valve shaft 128, and accordingly, the structure is made simple, which can result in cost and weight reduction.

Furthermore, the front end opening portion 119a of the first intake passage 119 is provided on the center portion in the vehicle width direction, and the front end opening portions 120a of the second intake passages 120 are provided in a manner of being distributed on the both sides thereof. Accordingly, a balance in introducing the intake can be ensured between the left and right sides, and the arrangement and constitution of the air intake passages is simplified.

Moreover, the baffle boards 122a arranged at the positions spaced from the front end opening portions 120a while forming the gaps from the front end opening portions 120a are attached into the intake duct 105. When the external air is introduced from the second intake passages 120 into the air cleaner 87, the water and the foreign object can be avoided entering the second intake passages 120 as much as possible due to a labyrinth structure by the baffle boards 122a.

In addition, the front end of the first intake passage 119 is made open to front at the front end of the intake duct 105, and the front end opening portions 120a of the second intake passages 120 are formed on the front end portion of the intake duct 105 so as to open to the direction different from the opening direction of the front end of the first intake passage 119. Accordingly, when the engine E rotates at high speed, wind is introduced into the first intake passage 119 efficiently, and thus intake efficiency can be enhanced. Moreover, it is made possible to make it difficult for foreign objects or water to enter the second intake passages 120 while introducing the air therethrough when the engine E rotates at low speed.

Moreover, when viewed from front, the front end portion of the intake duct 105 is formed into the approximately triangular shape such that the upper edge thereof is made to go along the lower end edge of the continuous portion of the head pipe 22 and both main frames 23 and 23 and that the lower edge portion thereof is made to go along the upper portion of the radiator 89 arranged below the intake duct 105. In a space between the radiator 89 and the continuous portion of the head pipe 22 and both main frames 23, the intake duct 105 can be effectively arranged while enlarging the opening portion of the front end portion thereof.

Furthermore, the actuator 141 mounted on the motorcycle in order to drive the exhaust control valve 156 controlled in response to the number of revolutions of the engine E is connected to the first and second intake control valves 126 and 127 in order to drive the first and second intake control valves 126 and 127 to open and close. Accordingly, the first and second intake control valves 126 and 127 can be driven while reducing the number of parts and the weight of the intake apparatus.

The first intake control valve 126 is one to be fixed to the valve shaft 128 having the axis orthogonal to the flowing direction of the air flowing through the first intake passage 119 and rotatably supported in the intake duct 105 in a manner of having the posture tilted rearward and upward in the state of closing the first intake passage 119. With such a constitution, an advantage is brought in terms of preventing the entry of the water or other foreign objects into the air cleaner 87 side. Specifically, though the water splashed by the front wheel WF or foreign objects that are ricocheted are prone to enter the upper portion in the front end opening portion of the first intake passage 119, when the first intake control valve 126 starts to operate from the valve closing state thereof to the valve opening side, it is more likely that the splashed water and ricocheted foreign objects will collide with the first intake control valve 126 even if the splashed water and the ricocheted foreign objects enter the front end opening end of the first intake passage 119. Thus, the water and the foreign object can be restricted from passing through the first intake control valve 126 and entering the air cleaner 87 side.

Furthermore, the first intake control valve 126 is formed such that, in the valve closing state thereof, the area of the portion above the valve shaft 128 is set larger than the area of the portion below the valve shaft 128, which is also advantageous in terms of preventing the entry of the foreign object to the first intake passage 119.

Moreover, the above-described first intake passage 119 opens in the vicinity of the bottom bridge 36 supporting the front fork 21, and the tip end thereof is fixed to the upper portion of the radiator 89. Accordingly, the first intake passage 119 can introduce the air thereinto from a region in the vicinity of the bottom bridge 36, where the ram pressure can be effectively obtained. It is therefore possible to introduce the air without adversely affecting the airflow to the radiator 89. Hence, the air can be controlled efficiently.

Furthermore, the above-described first intake passage 119 on the center is approximately formed to a width between pieces of the front fork 21, and each of the two second intake passages 120 on the sides thereof is approximately formed to a width of each piece of the front fork 21. Accordingly, when the first intake passage 119 opens, in addition to the airflow going straight toward the first intake passage, a part of the airflow flowing toward the front fork 21 is added and introduced into the first intake passage 119, and the ram pressure can be exerted more effectively. This case is advantageous in that the water and the foreign object are inhibited from entering the second intake passages 120 arranged at such positions as by the front fork 21.

The wheel axle 68 of the rear wheel WR is supported so as to be freely rotatable on the rear end portions of the swing arm 66 of which front end portion is swingably supported in the body frame F. The rear end exhaust portion of the exhaust system 150 connected to the cylinder head 86, which the engine body 50 mounted on the body frame F in front of the rear wheel WR includes, is arranged at the position higher than the wheel axle 68. The exhaust control valve 156 regulating the flow area in the second collecting exhaust pipe 153 is provided in the second collecting exhaust pipe 153 constituting a part of the exhaust system 150, and the exhaust control valve 156 is arranged in front of and above the wheel axle 68 of the rear wheel WR.

With such an arrangement of the exhaust control valve 156, the exhaust control valve 156 can be arranged at a position difficult to be affected by the rear wheel WR and separated from a ground contact surface of the rear wheel WR. Hence, the exhaust control valve 156 can be desirably arranged in a location where the operation of the exhaust control valve 156 is less affected adversely by the rear wheel WR and the ground contact surface.

Moreover, in case of fixing, to the first collecting exhaust pipes 152 partially constituting the exhaust system 150, the catalyst bodies 175, each of which has the case 176 cylindrically formed of the material different from that of the first collecting exhaust pipes 152 and is housed in each first collecting exhaust pipe 152, the bracket 178 made of the same material as that of the first collecting exhaust pipes 152 is welded to each of the inner circumferential surfaces of the wide portions 152a in the first collecting exhaust pipes 152, and the bracket 178 is crimped to the case 176 of the catalyst body 175.

Hence, even in the case where the case 176 of each catalyst body 175 and each first collecting exhaust pipe 152 are made of materials different from each other, the catalyst body 175 can be housed and fixed to the first collecting exhaust pipe 152, and a degree of freedom in selecting the materials for the case 176 of the catalyst body 175 and the first collecting exhaust pipe 152 can be increased.

In addition, each catalyst body 175 is formed in the manner that the catalyst carrier 177 allowing the flow of the exhaust gas through the cylindrical case 176 and formed in the circular column shape is housed in the case 176 while arranging the one end thereof inward of the one end of the case 176. Each bracket 178 is crimped to the one end of the case 176 at the portions protruding from the one end of the catalyst carrier 177. Accordingly, without affecting the catalyst carriers 177, the catalyst bodies 175 can be fixed to the first collecting exhaust pipes 152 with a simple structure.

Furthermore, in the exhaust system 150, the catalyst bodies 175 without any movable portions are arranged below the engine E, and in the exhaust system 150, the exhaust control valve 156 having a movable portion is arranged behind and above the engine E. Accordingly, the catalyst bodies 175 and the exhaust control valve 156 are spaced from each other in the exhaust system 150, and heat from the catalyst bodies 175 can be restricted from adversely affecting the exhaust control valve 156.

Note that this invention is not one to be limited to the above-described embodiment. For example, though this invention has been described by taking the motorcycle as an example, this invention can also be applied to a four-wheeled vehicle and a three-wheeled vehicle. Moreover, though the first intake control valve 126 is one having the posture tilted rearward and upward in the state of closing the first intake passage 119, the first intake control valve 126 can be set in the vertical direction in the closing state thereof. With such a constitution, it is made possible to downsize the valve unit (VU) by reducing the area of the first intake control valve 126.

Then, though description has been made for the case of arranging three intake passages in total, that is, the first intake passage 119 and the second intake passages 120 and 120 on the both sides thereof in this embodiment, the first intake passage 119 and the second intake passage 120, which are two, may be formed in line in the vehicle width direction as long as one of these intake passages can be opened when the other intake passage is closed.

While the embodiment of the present invention has been described above, the present invention is not one to be limited to the above-described embodiment, and it is possible to perform various design alterations without departing from the present invention described in patent claims.

For example, while description regarding the motorcycle has been made in the above-described embodiment, it is possible to carry out the present invention widely in association with a small vehicle such as the motorcycle and a three-wheeled vehicle.

Moreover, while description has been made regarding the intake duct 105 having the second intake passages 120 and 120 on both sides of the first intake passage 119 in the above-described embodiment, it is possible to apply the present invention also to a small vehicle including an intake duct having a second intake passage on one side of a first intake passage.

What is claimed is:

1. An intake apparatus of an engine for a vehicle with an engine mounted on a body frame that includes a head pipe in a front end of the body frame, the head pipe being configured to support a front fork that has a front wheel pivotably mounted thereon, the intake apparatus comprising:

an air cleaner for cleaning air to be supplied to the engine, the air cleaner being located behind the head pipe;

an intake duct arranged below the head pipe and extending forward from the air cleaner, the intake duct including a first intake passage and a second intake passage arranged on at least one side of the first intake passage, the first intake passage being located on a center line in a width direction of the front wheel, the first intake passage including a flow area that is larger than a flow area of the second intake passage;

an intake control valve for closing the first intake passage when the engine rotates at a first speed and for opening the first intake passage when the engine rotates at a second speed, where the first speed is lower than the second speed; and an actuator connected to the intake control valve to drive the intake control valve to open and close in response to engine rotation.

2. The intake apparatus according to claim 1, further comprising a second intake control valve for changing the flow area of the second intake passage to open the second intake passage when the engine rotates at the first speed and to close the second intake passage when the engine rotates at the second speed, the actuator connected to the second intake control valve to drive the intake control valve to open and close in response to engine rotation;

wherein the first intake control valve is fixed to a valve shaft rotatably supported in the intake duct.

3. The intake apparatus according to claim 1, further comprising a baffle board attached to the intake duct and arranged at a position spaced from a front end opening portion of the second intake passage, thereby forming a gap with the front end opening portion of the second intake passage.

4. The intake apparatus according to claim 1, wherein a front end of the first intake passage is configured to open forward on a front end of the intake duct, and a front end opening portion of the second intake passage is formed on a front end portion of the intake duct and is configured to open in a direction that is different from an opening direction of the front end of the first intake passage.

5. The intake apparatus according to claim 1, the intake apparatus being configured for use with a body frame of the vehicle that further includes a left-and-right pair of main frames extending rearward and downward from the head pipe with intermediate portions in a longitudinal direction of the main frames being curved to protrude out to the side, wherein a front end portion of the intake duct is formed into an substantially triangular shape when viewed from the front of the vehicle, an upper edge of the intake duct extends along a lower edge of a continuous portion of the head pipe and both main frames, and a lower edge of the intake duct extends along an upper portion of a radiator arranged below the intake duct.

6. The intake apparatus according to claim 1, wherein the actuator is mounted on the vehicle in order to drive an operating member that is controlled in response to the number of revolutions of the engine.

7. The intake apparatus according to claim 1, wherein the first intake control valve is fixed to a valve shaft having an axis orthogonal to a flowing direction of air through the first intake passage, and the first intake control valve is rotatably supported in the intake duct such that when the first intake passage is closed by the first intake control valve, the first intake control valve is tilted rearward and upward.

8. The intake apparatus according to claim 7, wherein the first intake control valve is configured such that when the first intake passage is closed by the first intake control valve, an area above the valve shaft is larger than an area below the valve shaft.

9. An intake apparatus of an engine for a vehicle, the intake apparatus comprising:
    an air cleaner having a first air intake passage and a second air intake passage, with both said first and second air intake passages being disposed so as to face a forward direction when installed on the vehicle; the first air intake passage being larger than the second air intake passage, and
    an actuator which drives a value unit, said actuator being responsive to engine rotation such that the first air intake passage is open and the second air intake passage is closed when the engine rotates at a first speed, and the first air intake passage is closed and the second air intake passage is open when the engine rotates at a second speed, the first speed being greater than the second speed.

10. The intake apparatus according to claim 9, wherein the first and second intake air passages are arranged in line in a width direction of the vehicle.

11. The intake apparatus according to claim 9, further comprising a third intake air passage, wherein the three air intake passages are arranged in line in a width direction of the vehicle.

12. The intake apparatus according to claim 9, wherein a plurality of the first and second air intake passages are provided, and said valve unit which is configured to open and close the first and second air intake passages is made as a single structure.

13. The intake apparatus according to claim 9, wherein said valve unit comprises a plurality of control valves configured to control the opening and closing of the first and second air intake passages provided in the respective passages, and wherein the respective control valves are controlled to open and close in a manner of being mutually interlocked.

14. The intake apparatus according to claim 9, wherein the first and second air intake passages open in the vicinity of a bottom bridge that supports a front fork, and ends of at least one of the first and second air intake passages are configured to be fixed to an upper portion of a radiator.

15. The intake apparatus according to claim 9, wherein the first and second air intake passages are formed into an approximately triangular shape and are upwardly convex, and are formed to go along a lower end edge of a front cowl when viewed from the front of the vehicle.

16. The intake apparatus according to claim 9, wherein at least two second air intake apparatus are formed on the sides of the first air intake apparatus, and the two second air intake apparatus are controlled to close together at the first speed and to open at the second speed.

17. The intake apparatus according to claim 16, wherein the first air intake passage is formed to a width that is approximately the width of the distance between the front forks of a motorcycle, and each of the two second air intake passages on the sides thereof are formed to a width that is approximately the width of a front fork.

18. An intake apparatus of an engine for a vehicle with an engine mounted on a body frame that includes a head pipe in a front end of the body frame, the head pipe being configured to support a front fork that has a front wheel pivotably mounted thereon, the intake apparatus comprising:
    an air cleaning means configured to clean air to be supplied to the engine, the air cleaner being located behind the head pipe; and
    an intake means arranged below the head pipe and extending forward from the air cleaner, the intake means including a first intake passage means and a second intake passage means arranged on at least one side of the first intake passage means, the first intake passage means being located on a center line in a width direction of the front wheel,
    wherein a flow area of the first intake passage means is larger than a flow area of the second intake passage means, and an intake control valve means is configured to close the first intake passage means when the engine rotates at a first speed and is configured to open the first intake passage means when the engine rotates at second speed, where the first speed is lower than the second speed.

* * * * *